(12) United States Patent
Linegar et al.

(10) Patent No.: US 8,902,167 B2
(45) Date of Patent: Dec. 2, 2014

(54) ADJUSTABLE ERGONOMIC KEYBOARD

(75) Inventors: Chris Linegar, Sydney (AU); Mark Norwalk, Austin, TX (US)

(73) Assignee: Key Ovation, LLC, Cedar Park, TX (US)

( * ) Notice: Subject to any disclaimer, the term of this patent is extended or adjusted under 35 U.S.C. 154(b) by 274 days.

(21) Appl. No.: 13/300,150

(22) Filed: Nov. 18, 2011

(65) Prior Publication Data
US 2012/0139842 A1    Jun. 7, 2012

Related U.S. Application Data

(63) Continuation-in-part of application No. 12/712,911, filed on Feb. 25, 2010, now Pat. No. 8,427,428.

(60) Provisional application No. 61/295,093, filed on Jan. 14, 2010, provisional application No. 61/250,402, filed on Oct. 9, 2009, provisional application No. 61/165,386, filed on Mar. 31, 2009.

(51) Int. Cl.
*G06F 3/02* (2006.01)
*G06F 1/16* (2006.01)

(52) U.S. Cl.
CPC ............ *G06F 1/1664* (2013.01); *G06F 1/1667* (2013.01); *G06F 3/0208* (2013.01); *G06F 3/0216* (2013.01)
USPC .......................................... 345/168; 345/156

(58) Field of Classification Search
CPC ... G06F 3/0202; G06F 3/0208; G06F 3/0213; G06F 3/0216; G06F 3/0219
USPC .................................................. 345/156–169
See application file for complete search history.

(56) References Cited

U.S. PATENT DOCUMENTS

| | | | |
|---|---|---|---|
| 5,073,050 A | 12/1991 | Andrews |
| 5,267,127 A | 11/1993 | Pollitt |
| 5,336,001 A | 8/1994 | Lichtenberg |
| 5,424,728 A | 6/1995 | Goldstein et al. |
| 5,426,449 A | 6/1995 | Danziger |
| 5,502,460 A | 3/1996 | Bowen |

(Continued)

FOREIGN PATENT DOCUMENTS

WO     2010117730 A1    10/2010

OTHER PUBLICATIONS

International Search Report and Written Opinion mailed from U.S. Patent and Trademark Office in PCT/US10/29067 on Jun. 29, 2010.

*Primary Examiner* — Vijay Shankar
(74) *Attorney, Agent, or Firm* — Haynes and Boone, LLP

(57) ABSTRACT

An adjustable keyboard having a number of keys is formed in at least two segments which are mutually movable relative-to one another using a hinge or joint. Each of the segments of the keyboard has keys mounted thereon. The adjustable nature of the keyboard reduces stress and discomfort to the user by reducing contortion to the user's wrists. More particularly, discomfort to the user caused by pronation of the wrists and/or ulnar deviation of the wrists is reduced. The hinge or joint is in the form of a ball and socket-type joint with a locking mechanism, which preferably includes a pivoted handle, in the form of a lever, used for locking and unlocking the hinge or joint. The surface of at least one of the ball and socket of the joint define a plurality of recesses or a plurality of projections, to provide increased resistance to joint movement.

17 Claims, 23 Drawing Sheets

(56) References Cited

U.S. PATENT DOCUMENTS

| | | |
|---|---|---|
| 5,543,787 A | 8/1996 | Karidis et al. |
| 5,613,786 A | 3/1997 | Howell et al. |
| 5,800,085 A | 9/1998 | Lee |
| 6,641,316 B1 | 11/2003 | Goldstein et al. |
| 6,984,081 B1 | 1/2006 | Goldstein et al. |
| 8,427,428 B2 * | 4/2013 | Linegar et al. ............... 345/168 |
| 2005/0002158 A1 | 1/2005 | Olodort et al. |
| 2006/0210340 A1 | 9/2006 | Atzmon |
| 2007/0285395 A1 | 12/2007 | Hargreaves et al. |
| 2010/0245250 A1 | 9/2010 | Linegar et al. |

* cited by examiner

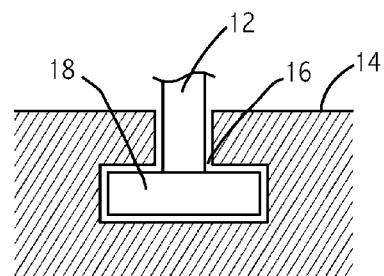
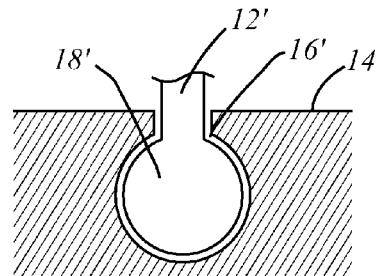
FIG. 6A  FIG. 6B
FIG. 7

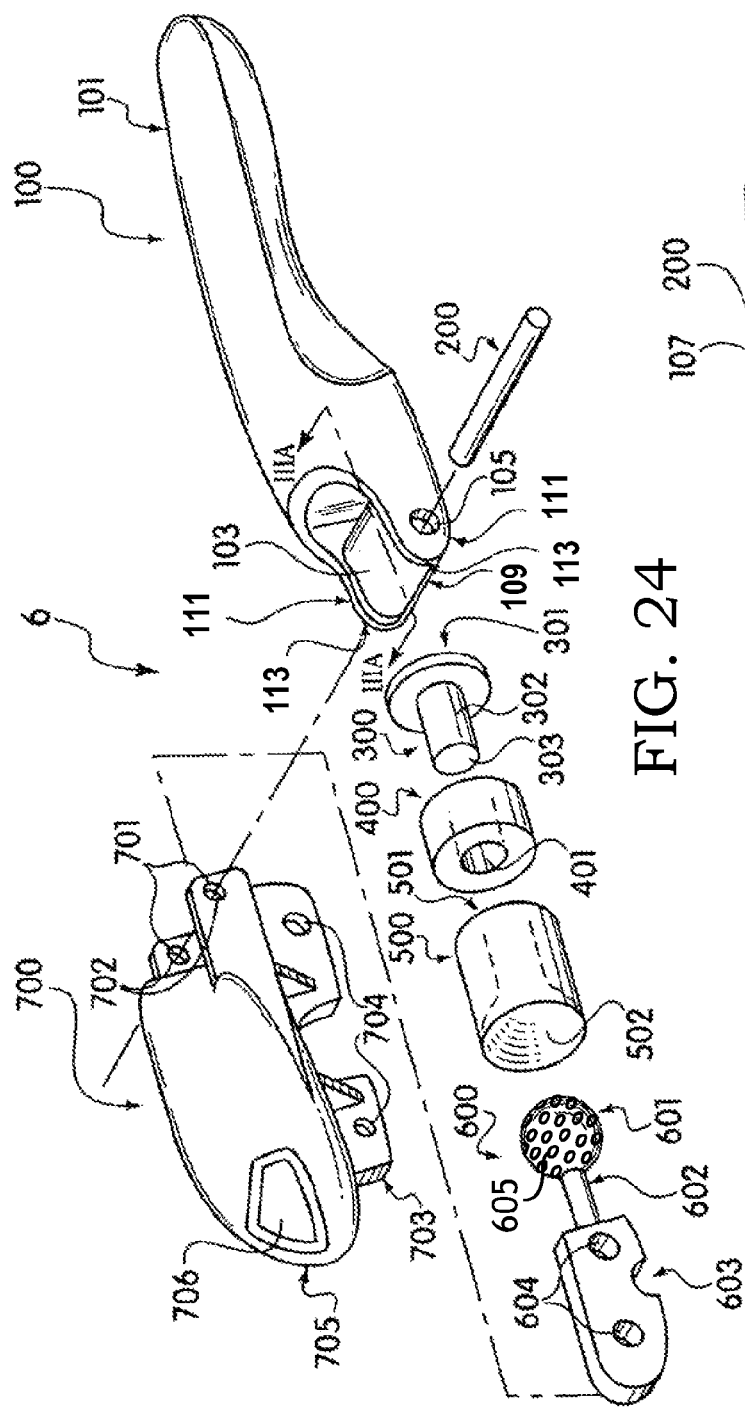
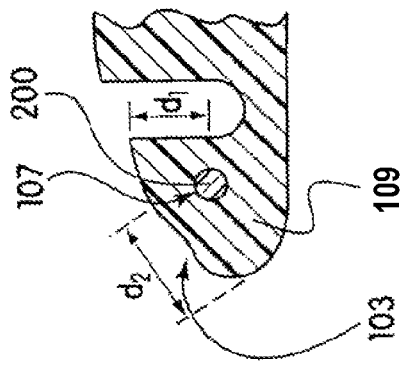
FIG. 24
FIG. 24A

ADJUSTABLE ERGONOMIC KEYBOARD

CROSS-REFERENCE TO RELATED APPLICATION(S)

The present application is a continuation-in-part of U.S. patent application Ser. No. 12/712,911 filed Feb. 25, 2010, now U.S. Pat. No. 8,427,428 which is a non-provisional application of, and claims the benefit of U.S. Provisional Application Nos. 61/165,386, filed Mar. 31, 2009; 61/250,402, filed Oct. 9, 2009; and 61/295,093, filed Jan. 14, 2010 each of which is incorporated herein in its entirety by reference.

BACKGROUND

1. Field of the Invention

The following invention relates to keyboards, and more particularly to a keyboard formed in mutually pivotable segments, which may be adjusted and locked into different ergonomic positions.

2. Description of the Related Art

Keyboards of the type used at computer terminals conventionally include a unitary board onto which alphanumeric keys are attached. It is often a disadvantage of such conventional keyboards that the wrists and/or arms and shoulders of a human user must be contorted into a configuration which may be stressful, particularly after prolonged use of the keyboard. This problem is brought about by the fact that, in most conventional unitary keyboard designs and key arrangements, the hands of the user must be turned outwardly by pivoting of the wrists relative to the forearms, resulting in ulnar deviation. Discomfort to the user caused by pronation of the wrists is also a problem with these conventional keyboards. Pronated postures can also transmit stresses into the neck and shoulders of the user.

It is generally desirable to reduce pronation and ulnar deviation of the wrists in computer keyboards. To that end, U.S. Pat. No. 6,984,081 describes adjustable keyboards with at least two segments which are movable relative to one another via a hinge or joint. By moving the segments, the orientation of the user's wrists and hands can be adjusted to allow for reduction of ulnar deviation and pronation of the wrists. Successful commercial embodiments generally in accord with such a design include the Goldtouch® adjustable keyboard and the Goldtouch Go!™ travel keyboard, both available from KeyOvation, LLC, Cedar Park, Tex.

Unfortunately, while adjustable ergonomic keyboards such as the aforementioned Goldtouch keyboard (and competing designs) provide desktop users with practical options to reduce pronation and ulnar deviation that may otherwise be associated with use of conventional unitary detached keyboards, portable computing devices (including laptop-, notebook- or netbook-type computers) have few options other than connection (e.g., by USB cable) of an auxiliary adjustable ergonomic keyboard. For some users, this may not be an attractive solution.

Accordingly, improved ergonomic keyboard solutions are desired.

SUMMARY

There is disclosed a keyboard having a plurality of keys, the keyboard having at least two segments that are mutually movable relative to one another, and wherein each segment of the keyboard includes some of the keys. Typically, the keyboard has at least two mutually pivotable segments which are attached to one another at a top end of the keyboard segments by way of a hinge or joint, such that a front edge of the keyboard may spread apart or "splay" in at least a substantially horizontal plane, to thereby reduce ulnar deviation in the keyboard user. Advantageously, the hinge or joint is adapted to allow pivoting in both horizontal and vertical planes such that the two segments of the keyboard may reside in different planes, so that the center of the keyboard is raised to reduce pronation and therefore decrease tension in the wrists and forearms of the user.

The hinge or joint may preferably be composed of a ball and socket joint which includes a locking mechanism. The locking mechanism can include a button, lever or other actuator operable on either of the segments or at the joint itself, to selectively free and lock the joint. In a particular embodiment, the locking mechanism may be fashioned using a pivoting handle, in the form of a lever, which includes a cam. The cam may be used to force bearing surfaces against a ball joint element, to thereby frictionally retain a ball and socket joint in a selected fixed position. Upon pivoting of the handle away from the keyboard, the cam may release the ball from the friction fit with the bearing surfaces, thereby allowing the ball to slide in the socket, and therefore allowing the keyboard segments to be adjusted relative to one another.

Similarly, a spring or other biasing mechanism may apply a locking force to the ball and socket, which force may be overcome by manual or automated actuators to temporarily allow mobility in the joint. In a particular embodiment, a button adjacent the joint allows for single-handed release, adjustment, and locking of the joint.

In some implementations, a friction surface of at least one of the ball and the socket of the joint define a plurality of recesses or projections to provide increased resistance to movement of the joint. In particular, the recesses and/or projections increase shear resistance to relative movement of the ball and socket.

In some implementations, one of the ball and socket define recesses or dimples and the other of the ball and socket define complimentary projections. The recesses and projections cooperate to provide shear resistance to movement of the ball within the socket.

In some implementations, one of the ball and socket define recesses or projections and the other of the ball and socket comprises a resilient surface material that at least partially conforms to the recesses or projections when the ball and socket are under compression.

In some implementations, the ball and socket are moveable between discrete positions in which projections or other surface features on one of the ball and the socket engage recesses or other complementary surface features on the other of the ball and socket. For example, projections may be arranged in ridges or grid-like patterns across a portion of the face of the ball with corresponding valleys or recess grids being formed on a portion of the socket that receives the ball. The recesses can receive the projections in a first locked position and the projections may be unseated from the recesses to allow repositioning of the ball and socket and the corresponding keyboard segments in a new locked position. Accordingly, a variety of surface features may be used on at least one of the ball and socket of a ball-and-socket joint to provide increased resistance to joint movement. Similarly, a variety of surface features may likewise be used on other types of cooperating surfaces and in other types of joints.

In some cases, the ball and socket are lockable in discreet positions or in a range of positions via a locking mechanism. In a particular case, the locking mechanism applies pressure to the ball and socket to increase the friction and/or shear resistance in the joint. In some cases, the ball and socket are held with sufficient pressure to remain fixed under normal typing forces, yet are moveable into various positions by overcoming the frictional and/or shear resistance of the joint, e.g., by forcing the keyboard segments into a desired position. Overcoming the resistance of the joint can include pivoting the first and second keyboard segments. Alternatively, overcoming the resistance of the joint can include applying a separating force, e.g., by pulling outward on each of the two keyboard segments.

In some cases, a support may be provided generally below the ball and socket joint so as to maintain the central region of the keyboard at a raised preselected level, if desired.

Beneficially, a number pad region of the keyboard can be provided which is pivotable relative to one of the segments such that the number pad region may reside in a plane other than the plane of the segment to which the number pad is hinged.

Typically, the keyboard is divided into segments that coincide with generally accepted keyboard areas used by a particular hand.

The present invention provides a keyboard in which the wrists of the operator need not be contorted as they would be in use of a conventional keyboard.

In order to electrically connect the keys of one segment of the keyboard to the other, a cable or other suitable wired or wireless connection may be provided between the two segments. Additionally, an infrared or electromagnetic signal may be used to transmit signals from the keyboard to the computing device without the need for a cable or other physical connection.

It has been discovered that an integrated, yet adjustable ergonomic keyboard may be provided using a design that accommodates simultaneous tenting and splaying of first and second keyboard segments that each include on an upper surface thereof respective subsets of keys that together define a generally complete alphanumeric keyboard. In some embodiments, a retainer extends from each of the first and second keyboard segments to retain the respective keyboard segment with respect to a base support. In general, the base support may include a stand-alone desktop platform or be integral (or integrable) with a portable computing device. The respective retainers allow the corresponding retained keyboard segment to rotate thereabout and to travel laterally with respect to the base support while retained. A joint couples the keyboard segments and allows the keyboard segments to pivot relative to one another.

Upward travel of the joint generally allows the keyboard segments to pitch or "tent", while at least one of the retainers allows an outer edge of the respective keyboard segment to travel laterally in correspondence with the tenting. Lateral travel of the joint (typically in a direction toward a human user) allows the keyboard segments to splay while each rotates correspondingly around an axis of a respective one of the retainers. Working together, the joint and retainers allow the keyboard segments to simultaneously tent and splay, while retained with respect to the base support. Notwithstanding the forgoing, tenting-only or splaying-only embodiments or configurations may be provided, if desired.

In some embodiments, the keyboard segments may be supplied in a configuration suitable for integration with a stand-alone base or a portable computing device, while in others, the keyboard segments may be integrated with such a base or portable computing device when supplied.

In general, a variety of attachment configurations are contemplated. For example, in some embodiments, retainers are generally fixed to respective keyboard segments and opposing ends of the retainers are allowed to travel in suitably defined channels. For example, in some embodiments, channels are defined in the upper surface of the base support, one end of each of the retainers is connected to a respective one of the keyboard segments, and respective ones of the channels allow lateral travel of respective ones of the retainers across a portion of the upper surface in correspondence with tenting of the keyboard segments. In some embodiments, suitable channels are instead defined in a lower surface of the keyboard segments. In some such embodiments, respective ones of the channels allow lateral travel of the keyboard segments with respect to respective ones of the retainers, while an opposing end of each of the retainers is generally fixed to the base support. As before, the base support may include a stand-alone desktop platform or be integral (or integrable) with a portable computing device.

In some embodiments, in a stowed position, the keyboard segments are retained at a first, closely spaced distance from the upper surface, whereas in one or more deployed positions, the keyboard segments are retained at a distance from the upper surface that exceeds the first distance and accommodates tenting action of the keyboard segments. In some variations, deployed positions include at least one shifted forward keyboard position. In some cases, the retainers may also permit the keyboard segments to be shifted or slid forward relative to a support structure.

In some embodiments, springs concentric with the retainers are used to urge the keyboard segments from the stowed position to at least one of the deployed positions. In some embodiments, the keyboard is moveable between stowed and deployed positions without the need for a spring or other biasing means. In some embodiments, one or more latches are provided to retain the keyboard segments in the stowed position.

In some embodiments, a generally planar surface is provided that is suitable for desktop use or for affixing to an upper surface of a portable computing device, wherein the retainers are coupled to the generally planar surface. In some cases, the generally planar surface is configured as a keyboard attachment platform that itself provides stowed and deployed positions. In some cases, one or more channels (such as previously described) are defined in the generally planar surface and one end of each of the retainers is connected to a respective one of the keyboard segments. The respective channel then allows lateral travel of respective ones of the retainers across a portion of the generally planar surface in correspondence with tenting of the keyboard segments. In other cases, one or more channels may instead be defined in a lower surface of the keyboard segments. Respective ones of the channels then allow lateral travel of the keyboard segments with respect to respective ones of the retainers, and opposing ends of each of the retainers are attached to the base support.

In some embodiments, retainers each include, at a first end thereof, a surface frictionally engageable to restrict travel of the respective retainer in a corresponding channel. In some embodiments, a locking mechanism is used to urge the frictionally engageable surfaces into a held position and thereby maintaining the keyboard segments in a tented position, a splayed position or a tented and splayed position. Frictionally engageable surfaces of the retainers may exhibit an at least partially convex profile, particularly if desirable to accommodate (at the corresponding end) at least some rotational freedom of movement. Likewise, the retainers each include at a second end thereof an at least partially convex end cap suitable for attaching the corresponding retainer while still allowing rotation freedom of movement in correspondence with tenting action of the keyboard segments.

In some embodiments, keyboard positional locking may be accomplished by a combination of joint and retainer locking mechanism that may be individually or jointly operable.

Another aspect of the invention features a portable computing device including a body portion; a screen containing lid portion hingedly attached to the body portion. The body portion presents a generally planar keyboard attachment surface or base support having channels defined therein to receive retainers extending upward toward respective first and second keyboard segments pivotably coupled at a joint. The channels are adapted to retain the respective retainers while allowing the retainers to travel laterally with respect to the keyboard attachment surface in correspondence with tenting and splaying of the keyboard segments. The keyboard segments each include on an upper surface thereof a respective subset of keys that together define a generally complete alphanumeric keyboard.

In some implementations the respective retainers allow the corresponding retained keyboard segment to rotate thereabout and to travel laterally with respect to the keyboard attachment surface while retained.

Another aspect of the invention features an apparatus including first and second keyboard segments each including on an upper surface thereof respective subsets of keys that together define a generally complete alphanumeric keyboard. A retainer extends from each of the first and second keyboard segments to retain the respective keyboard segment with respect to a base support. The respective retainers allow the corresponding retained keyboard segment to rotate thereabout and at least one of the retained keyboard segments to travel laterally with respect to the base support. A joint couples the keyboard segments and allows the keyboard segments to pivot relative to one another. The joint and/or the movable retainer can serve to fix the segments in a desired position.

In some implementations, upward travel of the joint allows the keyboard segments to tent, and at least one of the retainers allows an outer edge of the respective keyboard segment to travel laterally relative to the base support in correspondence with the tenting. Substantially lateral travel of the joint allows the keyboard segments to splay while each rotating correspondingly around a respective one of the retainers.

In some cases, the base support is an upper surface of a portable computing device. The base support defines at least one channel and each of the retainers is connected to a respective one of the keyboard segments, and wherein the respective channel allows lateral travel of the respective retainer across a portion of the base support in correspondence with tenting of the keyboard segments.

In some implementations, at least one of the retainers includes at a first end thereof a surface frictionally or matingly engageable with the base support to restrict travel of the respective retainer in a corresponding channel.

In some implementations, the base support is a stand alone base and the apparatus is configured as a peripheral input device.

In some implementations, first and second data output connectors are positioned respectively on the first and second keyboard segments adjacent the respective retainers. In some cases, both the respective retainer and data output connector are positioned substantially in an upper-outer quadrant of the respective keyboard segment.

In a particular implementation, the keyboard segments are configured to allow for at least one of splaying of about 30 degrees and tenting of about 30 degrees.

Another aspect of the invention features a portable computing device including a body portion and a screen containing lid portion hingedly attached to the body portion. The body portion presents a keyboard attachment surface having at least one channel defined therein to receive a retainer of one of a respective first and second keyboard segment pivotably coupled at a joint, the channel adapted to allow the retainer to travel laterally with respect to the keyboard attachment surface in correspondence with tenting and splaying of the keyboard segments.

In some implementations, a respective retainer allows the corresponding retained keyboard segment to rotate thereabout and to travel laterally with respect to the keyboard attachment surface.

In some implementations, the keyboard is configured to allow for at least one of splaying of about 30 degrees and tenting of about 30 degrees.

In some implementations, closure of the screen containing laptop lid returns the keyboard to a stowed position. In some implementations, the laptop lid is prevented from closing while the keyboard is in a deployed position.

In some implementations, the keyboard is disposed within a recess in the laptop body such that the edges of the keyboard are disposed adjacent or below an upper portion of the laptop body. In some cases, a bezel surrounds or partially encloses the keyboard retained in the laptop body.

While the forgoing represents a description of certain illustrative embodiments of the present invention, it is to be understood that the appended claims recite features of the present invention(s), and that additional embodiments are contemplated and may fall within the scope of the claims. Some aspects of the present invention, and in particular some exemplary pivoting motions of a ball and socket type joint used to connect first and second keyboard sections while allowing the tenting and splaying actions described herein will be understood by reference to U.S. Pat. No. 6,984,084 to Goldstein et al., the entirety of which is incorporated by reference herein.

BRIEF DESCRIPTION OF THE DRAWINGS

The present invention may be better understood, and its numerous objects, features, and advantages made apparent to those skilled in the art by referencing the accompanying drawings.

FIG. 1A depicts the adjustable integrated ergonomic keyboard in a stowed position. FIG. 1B depicts the adjustable integrated ergonomic keyboard in a released, but unlocked position. FIG. 2 depicts the adjustable integrated ergonomic keyboard in a tented and locked position. FIG. 3 depicts the adjustable integrated ergonomic keyboard in a tented, splayed and locked position. FIG. 4 depicts the adjustable integrated ergonomic keyboard in a tented and locked position within a recess in the laptop body. FIG. 5 depicts the adjustable integrated ergonomic keyboard in a tented, splayed and locked position extending partially beyond a recess in the laptop body.

FIGS. 6A and 6B depict retained-end configurations suitable for allowing lateral travel in a channel and/or rotational freedom of movement for retainers employed in some implementations of the present invention.

FIG. 7 depicts a top plan view of channels defined in a surface to accommodate lateral travel and/or rotational freedom of movement of retainers in correspondence with stowed, tented and splayed positions of an adjustable integrated ergonomic keyboard in accordance with some implementations of the present invention.

FIG. 18 depicts the adjustable integrated ergonomic keyboard in a stowed position. FIG. 19 depicts the adjustable integrated ergonomic keyboard in a released, but unlocked position. FIG. 20 depicts the adjustable integrated ergonomic keyboard in a tented and locked position. FIG. 21 depicts the adjustable integrated ergonomic keyboard in a tented, splayed and locked position.

FIG. 24 is an exploded perspective view of the components of an embodiment of a lockable joint with frictional surface features;

FIG. 24a is a cross-sectional view, through line IIIA-IIIA, of the cam of the embodiment of FIG. 24;

The use of the same reference symbols in different drawings indicates similar or identical items.

DETAILED DESCRIPTION

Figure 1A:
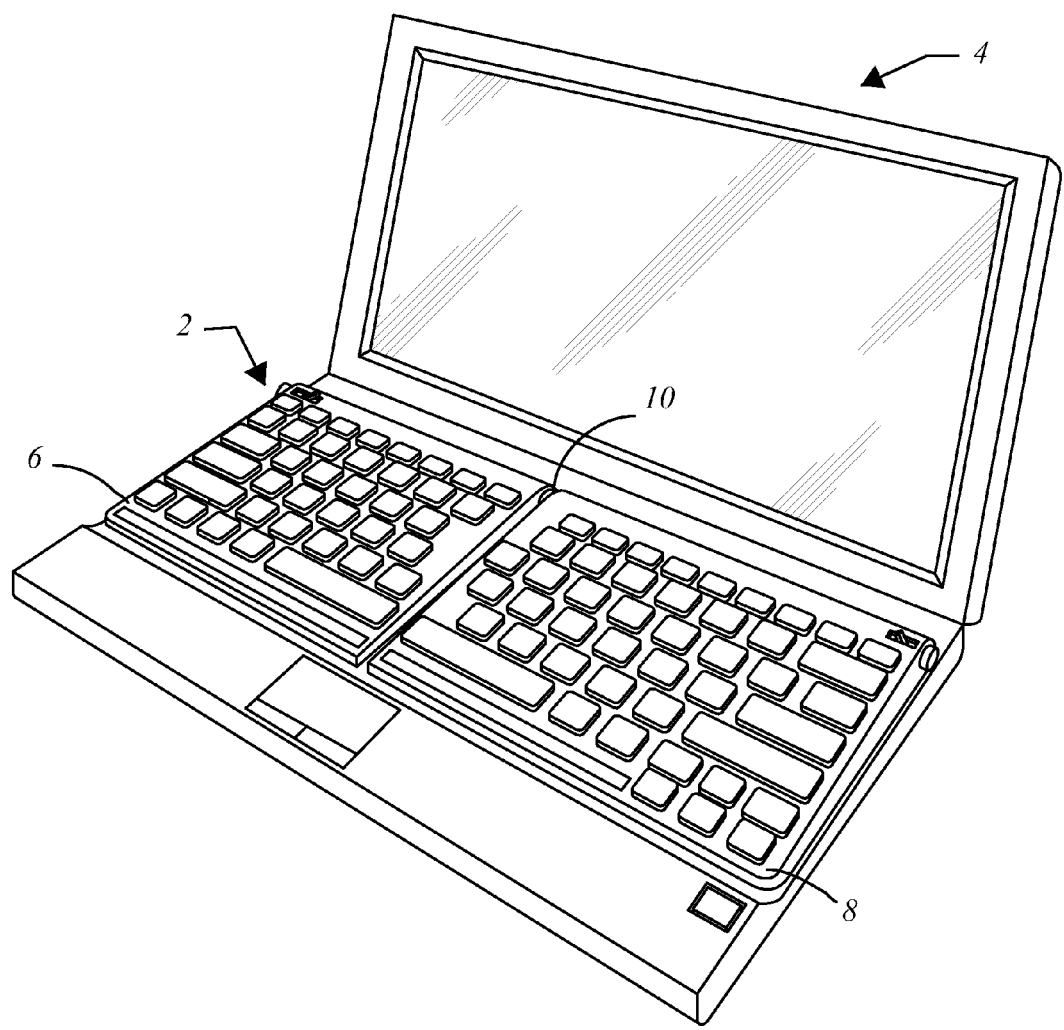
FIGS. 1A, 1B, 2-5 depict various positions of an adjustable ergonomic keyboard integrated in a laptop computer application in accordance with some implementations of the present invention.
Figure 1B:
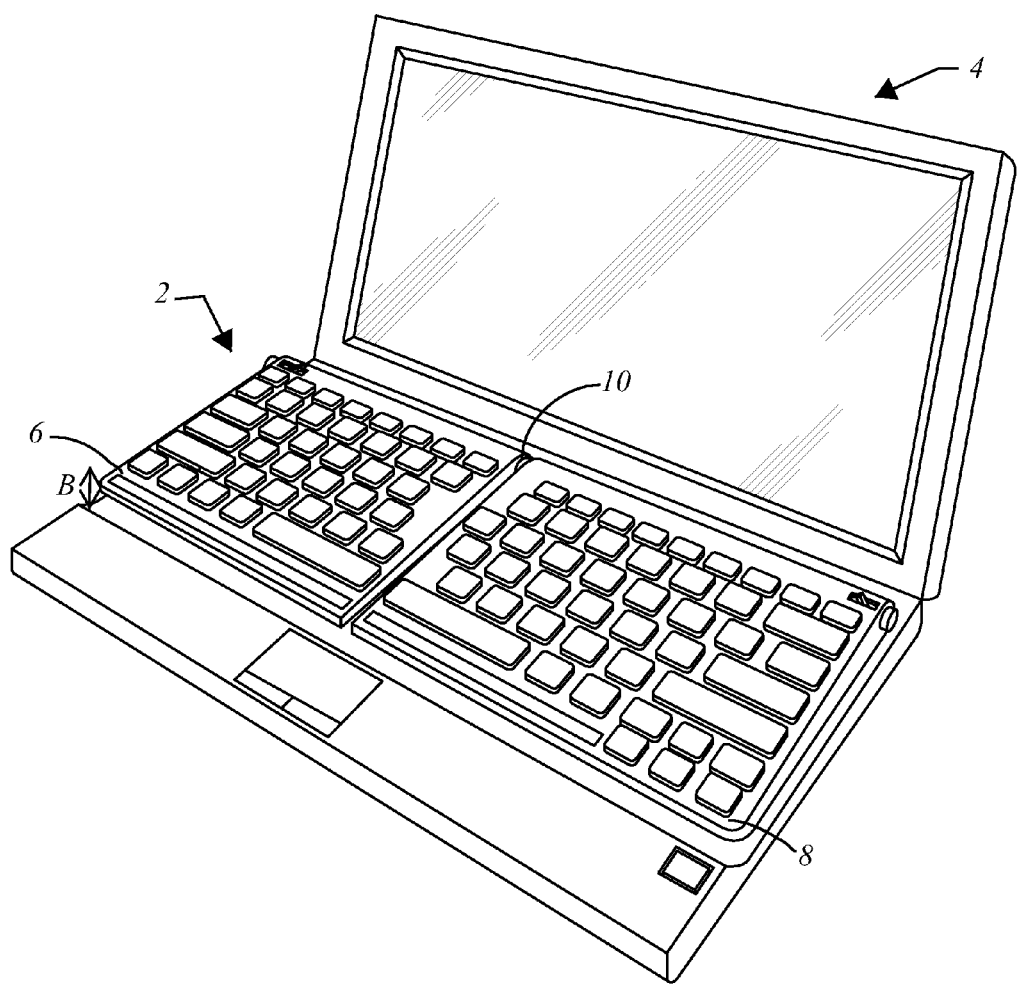

With reference to FIGS. 1A, 1B, an adjustable ergonomic keyboard 2 is integrated with a portable computer or a laptop 4. Keyboard 2 includes first and second keyboard segments 6, 8. Keyboard segments 6, 8 are attached to one another at a top portion by a hinge or joint 10 such that segments 6, 8 are mutually pivotable. Joint 10 provides multiple degrees of freedom of movement between segments 6, 8. Advantageously, joint 10 is adapted to allow pivoting in both horizontal and vertical planes of the adjacent coupled keyboard segments 6, 8. Joint 10 may be a ball and socket joint, living hinge, or combination of joints or structures suitable to couple segments 6, 8 with the described degrees of freedom. Joint 10 may be lockable to fix segments 6, 8 in a desired position.

With reference to FIG. 1A, keyboard 2 may be inset or retained in a first stowed position "A" during transport of laptop 4 or during use of keyboard 2 in a conventional keyboard position. With reference to FIG. 1B, keyboard 2 is moveable from the stored position "A" to a partially deployed position "B," in which segments 6, 8 are spaced with sufficient clearance from the body of laptop 4 to permit pivoting between segments 6, 8 in the horizontal and/or vertical planes. For example, keyboard 2 may "pop-up" an initial distance from the body of laptop 4 into partially deployed position "B" to provide such clearance. Such "pop-up" deployment may be provided, for example, by release of a spring loaded stowed locking mechanism. In some implementations, the laptop body provides sufficient clearance for tenting and/or splaying without the need for initial "pop-up" clearance.

In partially deployed position "B," adjustable integrated ergonomic keyboard 2 is in an unlocked position to be freely moved to a desired operating position. In alternative implementations, the body of laptop 4 may be configured to allow pivoting of segments 6, 8 directly from a stored position, for example, by providing sufficient clearance from laptop body contours surrounding keyboard 2.

Figure 2:
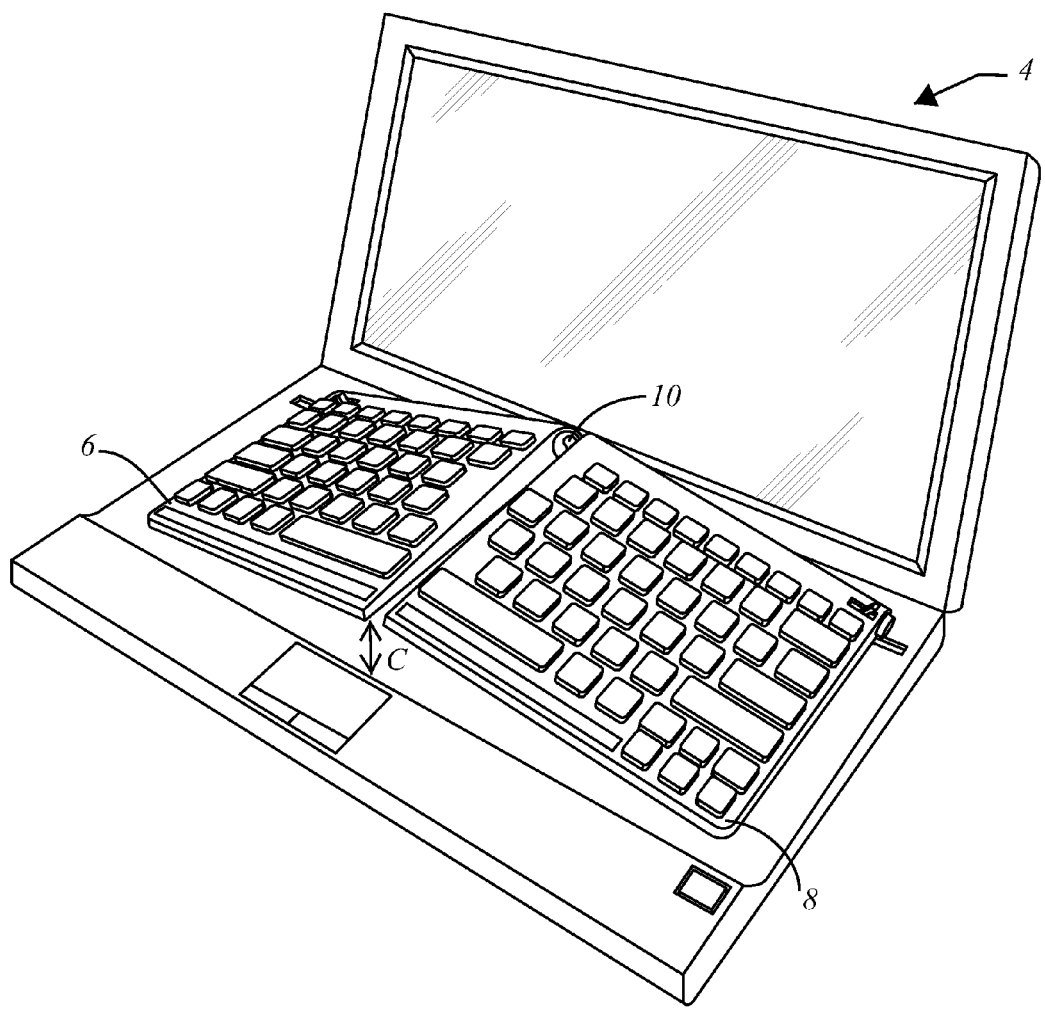
Figure 3:
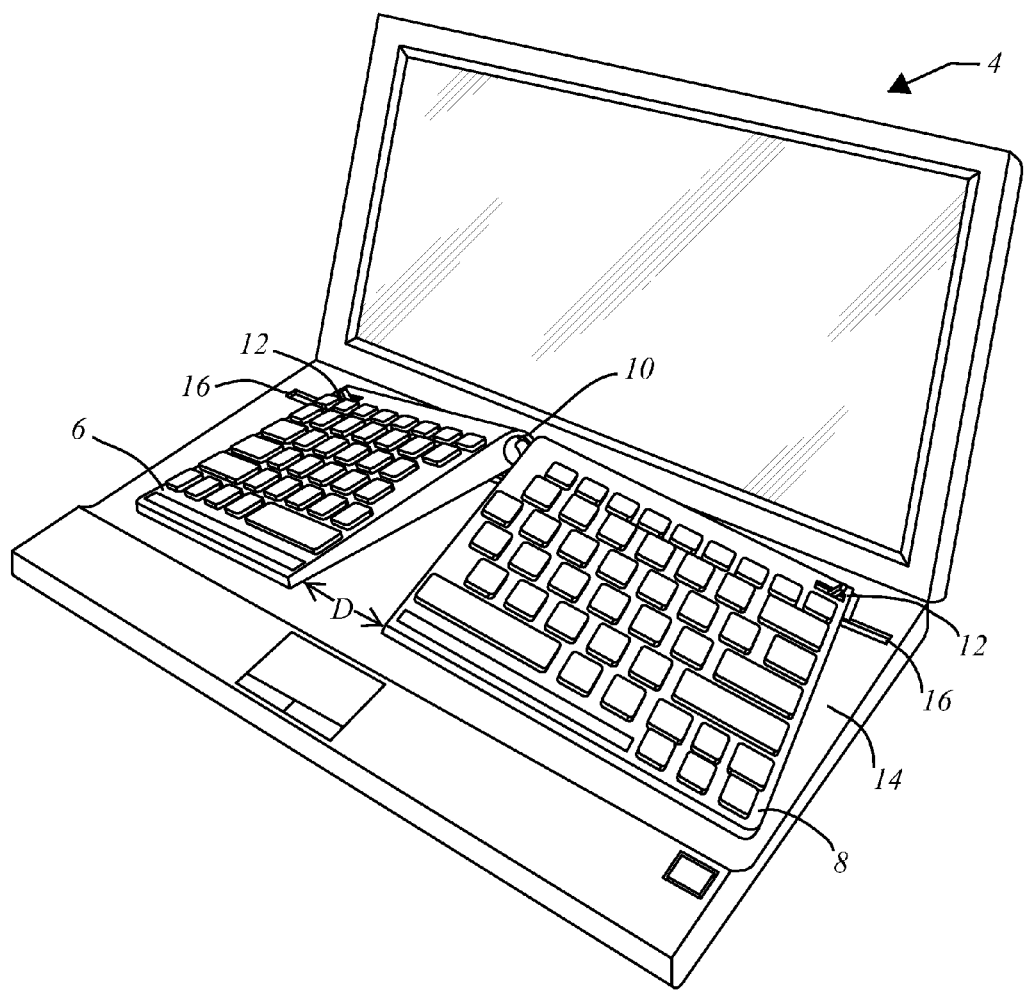

Note that in some embodiments, such as that illustrated in FIGS. 2-3, surface contours of the laptop body may accommodate motion between stored and deployed positions. Such surface contours may include, for example, tapered or rounded undercuts at the periphery of keyboard 2 and/or recesses in the laptop body adjacent the periphery of keyboard 2.

Figure 4:
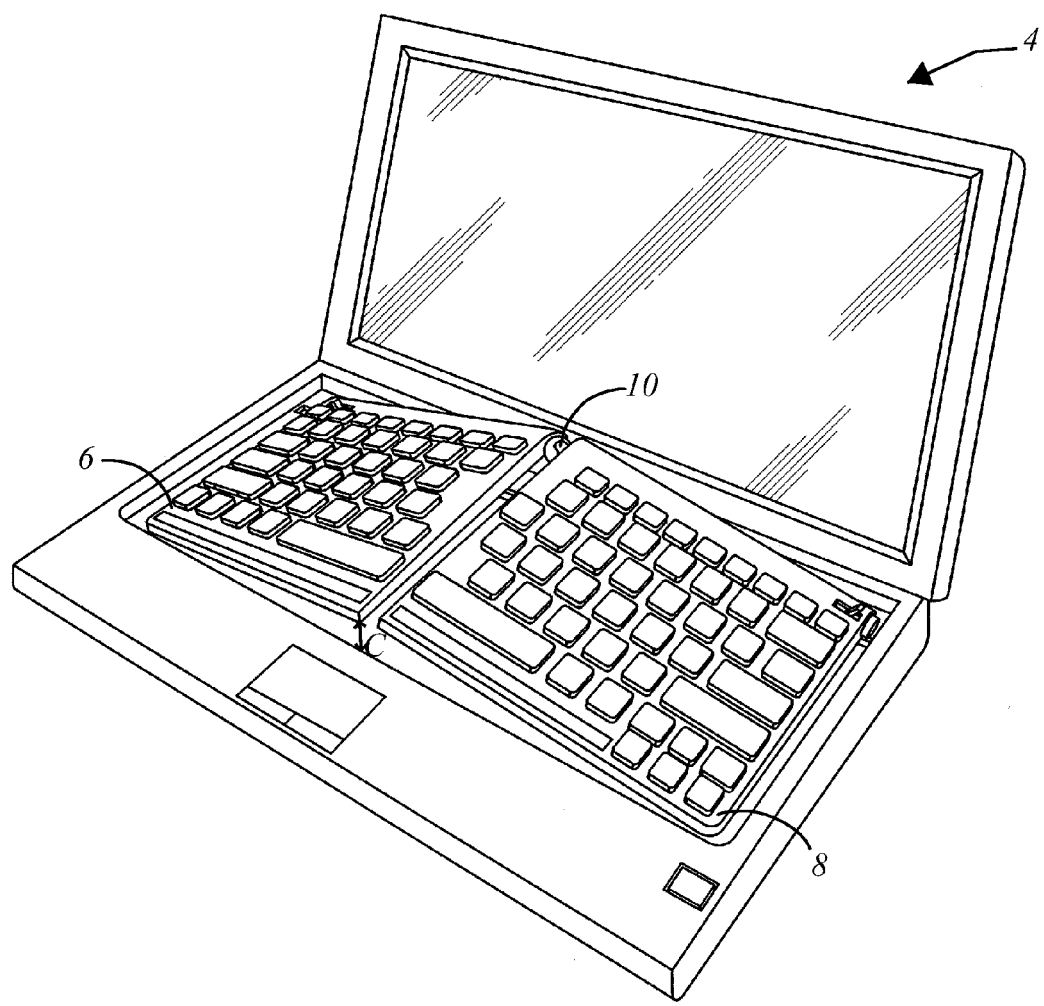
Figure 5:
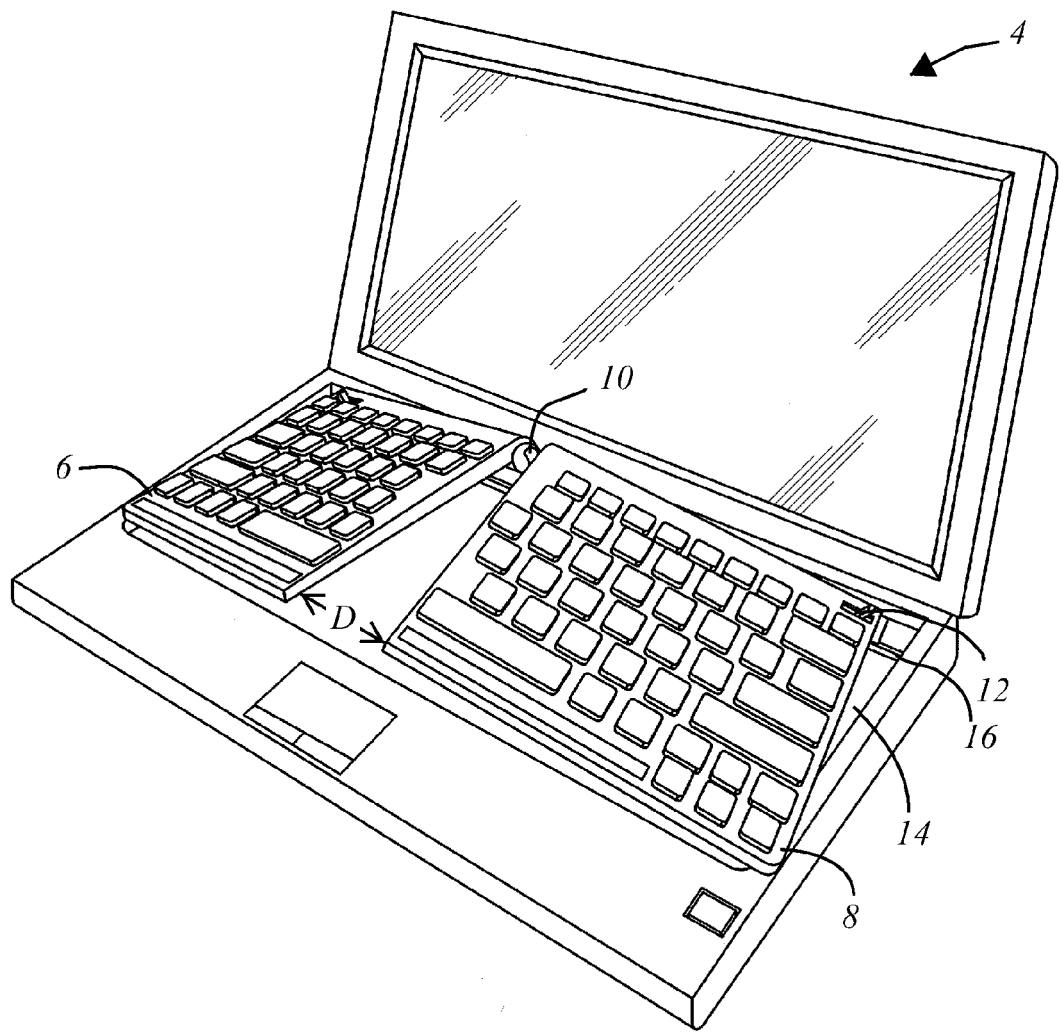

In some embodiments, such as that illustrated in FIGS. 4-5, it may be advantageous for keyboard 2 (or the laptop body) to be adapted to allow initial tenting motion to then provide additional clearance for splaying motion. For example, with reference to FIG. 4, keyboard 2 is initially movable from a stowed inset position within a recess in the laptop body to a tented position C within the recess. With reference to FIG. 5, keyboard 2 is then movable from tented position C to a tented and splayed position D. In the tented and splayed position D, a portion of the keyboard extends beyond the recess in the laptop body over a portion of the laptop body that is adjacent the keyboard when in the stowed position. Thus, keyboard 2 may be movable to partially extend over a bezel, laptop cover or other structure provided along an outer edge of keyboard 2. In some cases, a portion of the keyboard may extend under an adjacent bezel or cover portion in the stowed position, for example, to aid in locking the keyboard in the stowed position.

In some cases, surface contours of a portion of the laptop body cover or bezel adjacent keyboard 2 may include, for example, tapered or rounded contours at the periphery of keyboard 2 to provide clearance for splaying of the keyboard segments. As previously discussed, vertical keyboard segment movement may also be used to provide clearance for splaying of the keyboard segments.

With continued reference to FIG. 2, segments 6, 8 are pivotable within a vertical plane so that the center of keyboard 2 is elevated or pitched to a "tented" position "C." Tented position "C" reduces pronation and decreases tension in the wrists and forearms of the user. Joint 10 can be a ball and socket joint providing a range of movement in both the vertical and horizontal planes. In a particular implementation, joint 10 allows tenting of at least about thirty degrees between base support 14 and segments 6, 8. Similarly, joint 10 allows splaying of about thirty degrees between segments 6, 8.

Keyboard 2 with joint 10 preferably allows users to select a desired combination of tenting and splaying positions within a full ergonomically acceptable range. In some implementations, users may alternatively select an operational keyboard position from a combination of available discrete vertical and horizontal positions. Such positioning may be achieved using multiple joints providing discrete degrees of freedom. Further discrete positioning may be provided via a combination of ratcheting joints, or the like. Alternatively, joint may be a dimpled ball in a complementary socket arranged to provide variable positioning of segments 6, 8 in any desired combination of tented and splayed positions without regard to discrete positions or more limited degrees of freedom. Accordingly, joint 10 may be any coupling suitable to couple segments 6, 8 and to provide sufficient range of movement for tenting and splaying of segments 6, 8.

With reference to FIG. 3, segments 6, 8 are pivotable such that a front edge of keyboard 2 may spread apart in at least a substantially horizontal plane to a "splayed" position "D". The splayed position "D" reduces ulnar deviation in the keyboard user. In the illustrated configuration, keyboard 2 is both tented and splayed, although in some embodiments, keyboard segments 6, 8 may be in a purely splayed or purely tented position.

With continued reference to FIG. 3, keyboard segments 6, 8 are movably secured by retainers 12 to a base support 14 on an upper surface of laptop 4. Base support 14 defines one or more retention channels arranged to receive respective retainers 12 therein. Retainers 12 and channels 16 cooperate to allow movement of segments 6, 8 from stowed position "A" to tented position "C" and splayed position "Retainer" as used herein refers to any structure suitable to secure keyboard segment 6, 8, to base support 14. Retainer 12 may be fixed or moveable with one or more degrees of freedom relative to either of segments 6, 8 or base support 14 and still suitably retain segments 6, 8. Retainers prevent separation of segments 6, 8 from base support 14 and may allow segments 6, 8 while retained to base support 14.

In some illustrated embodiments, retainers 12 define a vertical or columnar extent. In many embodiments, not separately illustrated, however, retainers 12 have a minimal vertical extent and may be characterized by low profile retainer features arranged to attach segments 6, 8 to base support 14. For example, an hourglass or double lobe type retainer with minimal distance between the lobes may be used in complementary sockets and channels on keyboard segments 6, 8 and base support 14. Similarly, a head of retainer 12 may be received within channel 16 and present a protrusion connectable to keyboard segments 6, 8 via snap-fit or other suitable connection. Accordingly, retainers 12 are not limited to columnar, elongated, or other illustrated or described configurations and may be any shape or construction suitable to retain segments 6, 8 to base support 14.

While base support 14 is depicted as defining two channels 16, each corresponding to one of segments 6, 8, it is understood that a single channel 16 in base support 14 can provide sufficient lateral movement for tenting of segments 6, 8. Accordingly, descriptions or depictions of multiple channels may be understood to also generally apply to implementations having but a single channel. In some cases, multiple channels may provide design advantages as to visual symmetry of keyboard 2 relative to the body of laptop 4 in either a stowed position or operational position. In some cases, a single channel design may provide improved ease of use by allowing a user to manipulate joint 10 with one hand and manually lock retainer 12 within a single channel 16.

"Channel" as used herein refers to a structure suitable to restrain retainer 12 in at least one direction, while permitting movement of retainer 12 in another direction. For example, channel 16 may be a slot, groove, guide or track in the conventional sense of the word, but is not so limited. Channel 16 may be, for example a socket which restrains retainer 12 from separation therefrom while permitting pivoting or rotational movement therein.

With reference now to FIGS. 6A and 6B, channel 16, 16' is defined in base support 14 to receive retainer 12, 12' and allow for lateral travel and/or rotational freedom of movement of retainers 12, 12'. Base support 14 may be a chassis surface or body panel surface of laptop 4, or any structure suitable to serve as the support structure or foundation for segments 6, 8 of keyboard 2 during deployment and use. Thus, while base support is depicted as a generally planar upper surface of laptop 4, lateral laptop surfaces and other structures may also be suitable. For example, base support 14 may be a panel or frame structure insertable into a recess defined in the body of laptop 4. Alternatively, base support 14 may be a panel or frame structure constructed as a stand alone base such that keyboard 2 may instead be used as a stand alone peripheral input device, e.g., for connection to a desktop computer.

Base support 14 has defined therein, one or more channels 16, 16'constructed to receive retainer 12, 12', which is attached to a corresponding keyboard segment 6, 8. Channel 16, 16' is constructed to restrain a retainer head 18, 18' in a vertical plane and thereby retain segment 6 or 8 to base support 14. Channel 16, 16' is also constructed to provide clearance for retainer 12, 12' to spin therein as keyboard segments 6, 8 are splayed and for retainer 12, 12' to slide therein as segments 6, 8 are tented. In some cases, only a fraction of an inch of lateral sliding clearance is sufficient to allow for full movement of segments 6, 8 into tented position "C."

Similarly, rotation of retainer 12, 12' within channel 16, 16' may be restricted to a discrete range suitable to allow for full movement of segments 6, 8 into splayed position "D." While retainer heads 18 and 18' are depicted as being substantially symmetrical shapes, in some implementations, retainer head 18 may define an eccentric shape, e.g., a cammed shape so as to impact upon sidewalls of channel 16 at one or both extremes of a predetermined range of rotation. In some implementations, an eccentric or cammed retainer head 18 configuration may be advantageous in locking or restricting retainer 12 in a fixed position within channel 16. For example, a manual or powered actuator may urge retainer head 18 to impact upon the sidewalls of channel 16. Accordingly, retainer head 18, 18' may be constructed to provide free lateral movement and/or rotation within channel 16, 16' in a first orientation and to restrict lateral movement and/or rotation in a second orientation.

With reference to FIG. 7, channel 16" may provide various discrete positions or a positional path or network for retainer 12 to achieve a range of tenting and splaying positions of keyboard 2. Accordingly, channel 16 need not be limited to a single course or to a linear or uniform configuration, but may be curved, inclined, tapered, or the like. Similarly, retainer 12 may be of any number of symmetrical or asymmetrical shapes and may include resilient or engaging features to facilitate positional locking. For example, a resilient retainer head or convex retainer head may provide frictional engagement with a tapered upper surface of channel 16. Alternatively, a serrated retainer head surface may positively engage complimentary recesses on a channel surface. Accordingly, any number of frictional, mating or positively engaging features may be used to restrict movement of retainers 12 within channel 16.

Figure 8:
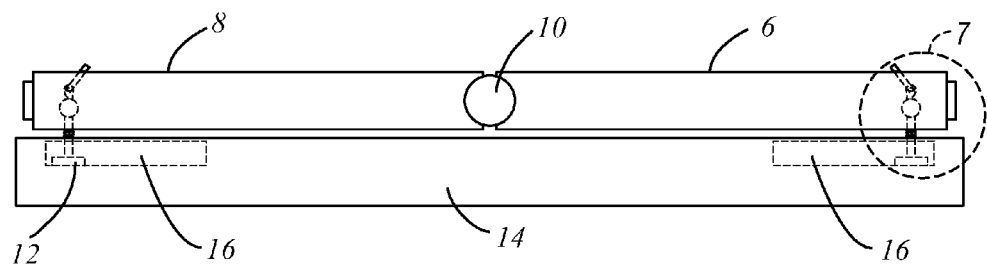
FIG. 8 and the accompanying exploded detail of FIG. 9 illustrate positional relations between keyboard segments, retainers and channels in stowed position of an adjustable integrated ergonomic keyboard in accord with some implementations and configurations of the present invention.
Figure 9:
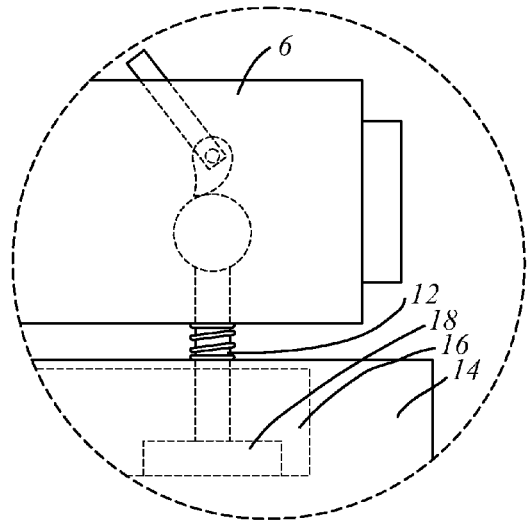

With reference to FIG. 8 and the accompanying exploded detail of FIG. 9, keyboard segments 6, 8 are in a stowed position closely spaced to base support 14, with retainers 12 positioned accordingly within channels 16. While a particular columnar retainer is used to illustrate one frictionally engageable configuration, the invention is not so limited, and any number of suitable retainer configurations, including low profile retainers, may be used. Keyboard 2 may be held in the stowed position by retainers 12 or, alternatively, by a separate latching mechanism. Suitable latching mechanism may provide releasable connections via magnetic forces, snap-fit, positive engagement of complementary features, and the like.

With reference to FIG. 9, in some implementations, keyboard segment 6 or 8 may be biased towards a deployed position. For example, spring 20 may urge keyboard segment 6 away from base support 14 into a partially deployed position. Spring 20 may be arranged concentric to retainer 12 or may be alternatively suitably arranged between segment 6 and base support 14.

In some implementations, retainer head 18 may be biased by spring 20 towards a top or bottom surface of channel 16 to restrict movement of retainer 12 within the channel. For example, a spring may restrict movement of retainer 12 in a first default position and may be overcome by manual or powered actuation to release retainer 12 within channel 16. Alternatively, a spring may be used to bias retainer 12 towards a freely movable position and may be overcome by manual or powered actuation to restrict movement of retainer 12 within channel 16. Spring 20 may also serve as a clutching mechanism so that if too much pressure is exerted on the keyboard segments 6, 8, spring 20 allows for slippage between retainer 12 and channel 16. Suitable springs may include any suitable mechanical spring, resilient elastomeric material or other known biasing mechanism. In some cases, mechanical or electrical actuators may serve to urge retainers 12 and/or segments 6 or 8 towards deployed and/or stowed positions. In some implementations, the keyboard is moveable between stowed and deployed positions without the need for springs, biasing means, or actuators. For example, such movement may be accomplished purely manually.

Figure 10:
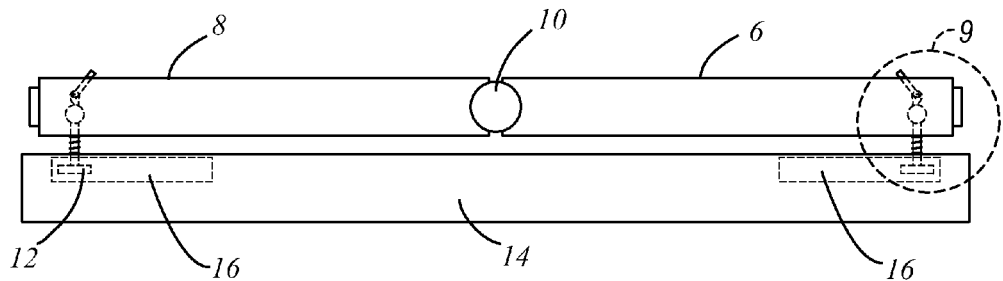
FIG. 10 and the accompanying exploded detail of FIG. 11 illustrate positional relations between keyboard segments, retainers and channels in a released, but unlocked position of an adjustable integrated ergonomic keyboard in accord with some implementations and configurations of the present invention.
Figure 11:
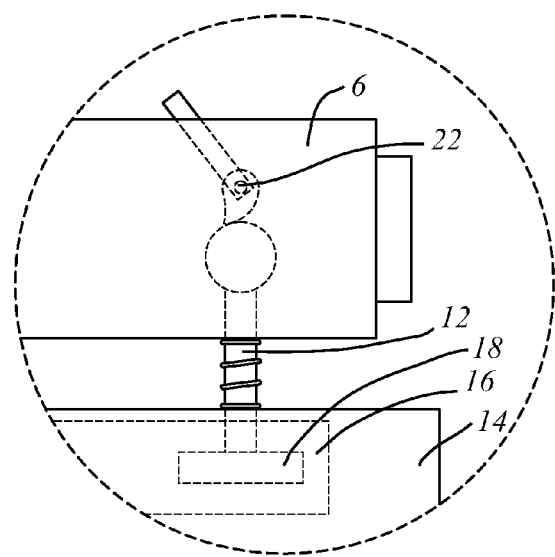

With reference to FIG. 10 and the accompanying exploded detail of FIG. 11, keyboard segments 6, 8, are in a partially deployed position with retainers 12 being moveable within channels 16. Retainers 12 are shown in a released and unlocked position, which permits adjustment of ergonomic keyboard 2 by a user to a desired tented and splayed position.

Figure 12:
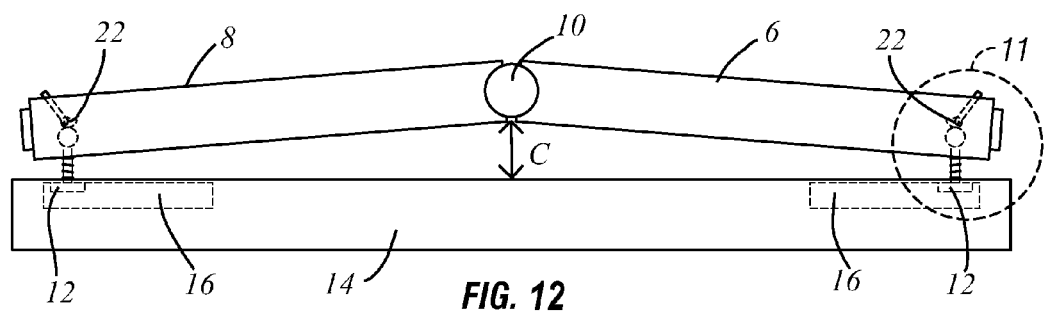
FIG. 12 and the accompanying exploded detail of FIG. 13 illustrate positional relations between keyboard segments, retainers and channels in a tented and locked position of an adjustable integrated ergonomic keyboard in accord with some implementations and configurations of the present invention.
Figure 13:
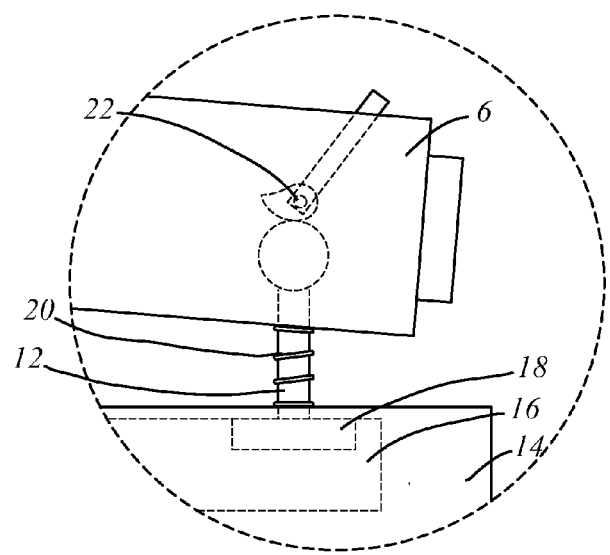

With reference to FIG. 12 and the accompanying exploded detail of FIG. 13, keyboard segments 6, 8 are held in tented position "C" via retainers 12, which are restricted laterally within channels 16. Movement between the partially deployed position of FIG. 10 and tented position "C" is accomplished by inward lateral movement of one or more of retainers 12 within channels 16. Upon movement of segments 6, 8 from the released, partially deployed position to tented position "C," the user may engage a locking mechanism 22 to restrict outward lateral movement of one or more of retainers 12 within channels 16.

With reference to FIGS. 11 and 13, locking mechanism 22 is depicted as a levered cam acting upon retainer 12. In a first position shown in FIG. 11, locking mechanism 22 is actuated to overcome spring 20 and distance retainer head 18 from a top frictional surface of channel 16. In a second position shown in FIG. 13, locking mechanism 22 is retracted somewhat to permit spring 20 to again urge retainer head 18 into contact with frictional contact or mating contact with a surface of channel 16. Frictional contact may be provided between any portion of retainer 12 and channel 16. "Mating contact" refers to positive engagement of cooperative features to provide shear resistance to movement.

The pivotable or levered cammed mechanism is but one example of locking mechanism 22. Any number of manually actuatable mechanisms such as levers, push buttons, dials, sliders, cables, and the like may be used to selectively restrict movement of retainers 12 and/or joint 10 and thereby movement of segments 6, 8 relative to base support 14. Powered actuators such as solenoids, worm drives, gear trains or the like may likewise be used to selectively restrict movement of retainers 12 and/or joint 10. It will be understood that locking mechanism 22 may be arranged on either keyboard 2 or base support 14 to suitably restrict retainer 12 within channel 16. Similarly, while retainers 12 are generally depicted as extending from keyboard 2 to be received within channels 16 formed in base support 14, retainers 12 may extend, instead from base support 14 to be received in channels 16 formed in keyboard 2.

Accordingly, while some embodiments are depicted as including a locking mechanism 22 and spring 20 associated with retainers 12, it will be understood that other embodiments are not so limited. For example, the springs may be omitted or the locking mechanisms may be provided instead at joint 10. Similarly, joint 10 may be self locking, e.g., due to joint friction or other suitable resistance.

In some implementations, a locking mechanism structure includes substantially alignable apertures defined in adjacent locking plates, wherein one or both of the locking plates is moveable to substantially misalign the apertures to bind upon and thereby lock a retainer disposed therein. In some cases, relative positioning of the locking plates determines a retainer positioning and thereby a keyboard deployed position.

In some implementations, the retainer includes a ball which may be seated in a recess in a stowed position. The retainer ball may be unseated from the recess to move the segments into a deployed position. For example, a splay actuator and/or tenting actuator, e.g., lever or cable, causes the retainer ball to slide within a channel formed on one of the base support and a keyboard segment. A curved channel or non-planar channel may serve to provide both tenting and splaying motions.

In some implementations, actuators may act on the joint 10 with retainers 12 tracking or responsive to movement of joint 10.

In some implementations, thumbwheels or other rotary actuator serve to move the keyboard segments between stowed and deployed positions. For example, the retainers may be an axle of a wheel restrained within a channel. Scrolling the wheel along the channel causes tenting and/or splaying of the keyboard segments.

Alternatively, retainers 12 can include threaded knobs which may be rotated to selectively permit and prevent keyboard segment movement. For example, one or more retainer knobs may be loosened to adjust one or both of the splay and pitch of the keyboard segments.

Still in some implementations, underlying supports, e.g., pivoting braces or columns, may be used to maintain the keyboard segments in a desired deployed position. In a particular implementation, the underlying support is provided at the joint between the keyboard segments.

In some implementations, segments 6, 8 may be additionally or alternatively maintained in a tented and/or splayed position via restriction of joint 10 itself. As previously disclosed in U.S. Pat. No. 6,984,081, joint 10 may be compressed into a frictionally restricted state or may be otherwise restricted in a desired position. For example, as described more fully with reference to FIGS. 22-26, an elastomeric surface on one of a ball surface and a complementary socket surface of joint 10 may be deformed in response to localized compression from a dimpled complementary surface. Alternatively, complementary projections and/or dimples on opposed joint surfaces may be held in mating engagement via interference fit, a spring, latch or other suitable locking mechanism.

Figure 14:
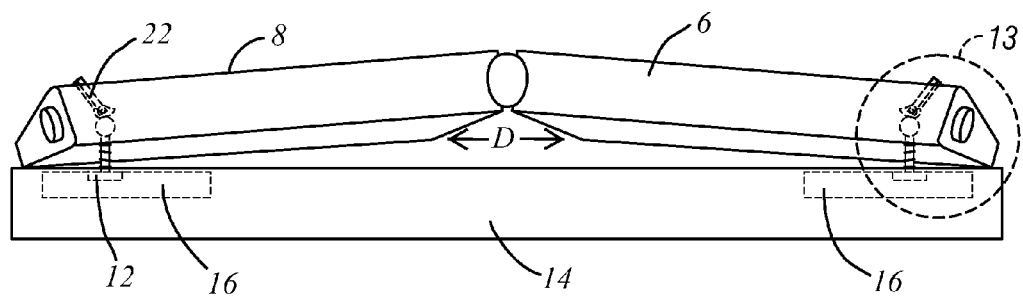
FIG. 14 and the accompanying exploded detail of FIG. 15 illustrate positional relations between keyboard segments, retainers and channels in a tented, splayed and locked position of an adjustable integrated ergonomic keyboard in accord with some implementations and configurations of the present invention.
Figure 15:
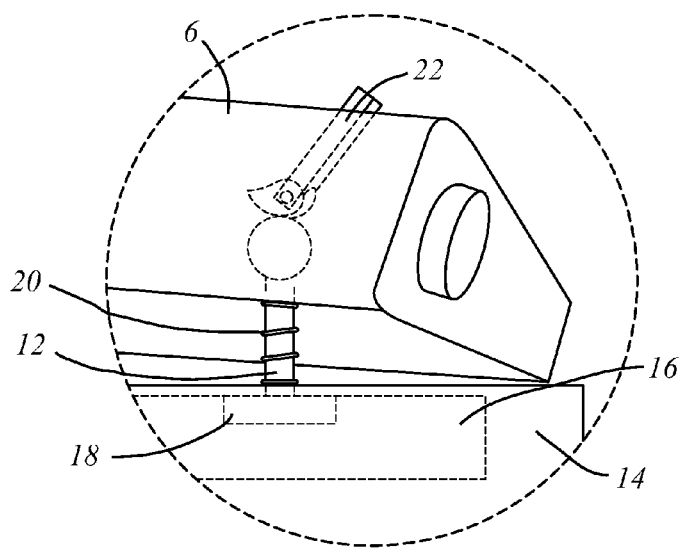

With reference to FIG. 14 and the accompanying exploded detail of FIG. 15, keyboard segments 6, 8, are held in splayed position "D." Retainers 12 permit movement from a partially deployed position or even from a tented position to splayed position "D" via rotation of retainers 12 within channels 16. Splaying of segments 6, 8 involves a rotation movement as well as translational movement of retainer 12. Splaying of segments 6, 8 about joint 10 causes inward movement of retainers 12 as joint 10 travels forward towards the user. Splaying further causes rotation of or about retainer 12 as outer lower quadrants of keyboard segments 6, 8 swing outward in response to forward movement of joint 10.

In some implementations, locking mechanism 22 is constructed to resist both translation and rotation of retainers 12 within channels 16. In some implementations, separate locking mechanisms may be provided to resist each movement separately. For example, in some implementations, constant resistance to rotation of retainer 12 may be provided, sufficient to resist forward or rearward movement of joint 10 during normal typing operations, yet subject to direct manual manipulation of joint 10 between deployed and stowed positions. Such limited slip or clutched arrangements may be achieved by frictional engagement or other engagement of retainer head 12 and channel 16 under the force of spring 20 or other suitable mechanism. Alternatively, sufficient rotational resistance may be provided within joint 10 itself. For example, joint 10 may be a ball and socket joint with sufficient interference fit to permit movement only under a predetermined degree of manual force. Alternatively, joint 10 may be selectively resistant, for example, via release of a compression fit within joint 10 via a manual actuator.

It may be further advantageous to provide for slippage or release of the locking mechanism upon application of a predetermined downward pressure, for example during abrupt closure upon keyboard 2 of a laptop lid portion. In some implementations, closure of the laptop lid releases a locking mechanism to return keyboard 2 to a stowed position. Alternatively, in some implementations, the laptop lid is prevented from closing or may receive additional resistance to closure while keyboard 2 is deployed. In some cases, cables, levers, push pins, or other suitable mechanical or electrical actuator may be associated with the laptop lid or lid hinge to act on a keyboard locking mechanism during laptop lid closure. Such actuators may similarly be used to urge keyboard 2 into a deployed position during opening of the laptop lid. For example, a cable may be drawn by laptop lid movement to urge retainers towards one of a deployed or stowed position.

Figure 16:
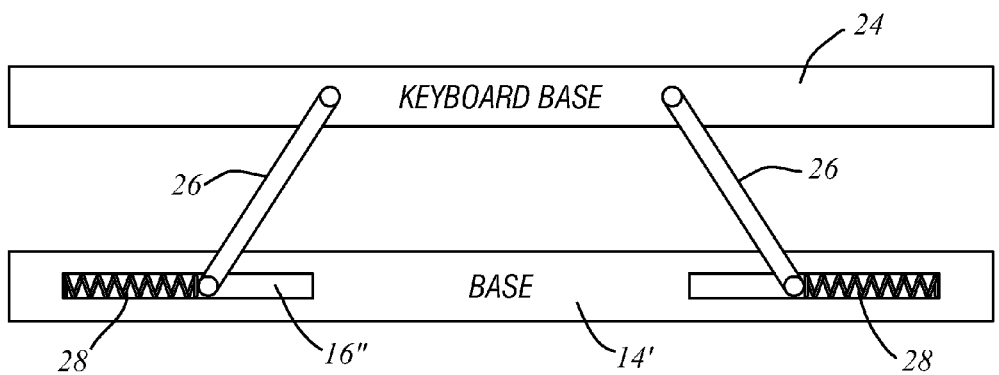
FIG. 16 depicts an extendible, and upwardly deployed, keyboard base surface for use in conjunction with some implementations and configurations of an adjustable integrated ergonomic keyboard in accordance with the present invention.
Figure 17:
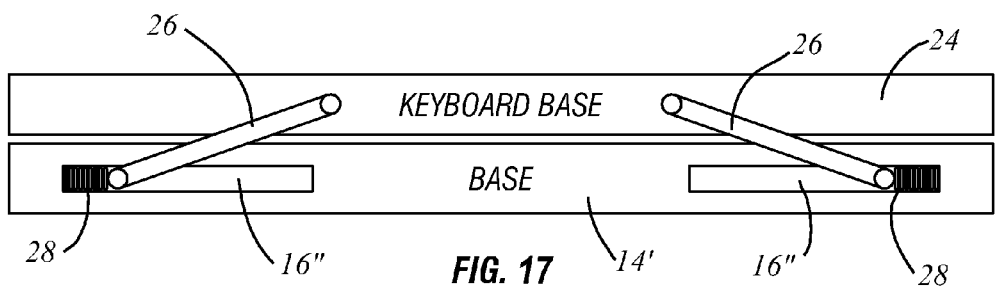
FIG. 17 depicts the keyboard base surface stowed in accord with some implementations and configurations of the present invention.

With reference to FIG. 16, an upwardly deployable keyboard base 24 serves to elevate at least a portion of keyboard 2 above base support 14'. If supporting linkage 26 is retained at one end in channel 16" formed in base support 14'. Keyboard base 24 may be stowed as shown in FIG. 17, by collapsing of linkages 26 as springs 28 are compressed within channels 16".

In some laptop integrated embodiments, segments 6, 8 are independently electrically connected in parallel to laptop 4. In other embodiments, segments 6, 8 are electrically coupled in series to provide a single output to laptop 4. Accordingly, segments 6, 8 may be electrically connected to or integrated with laptop 4 in any suitable manner. In some embodiments, it may be advantageous or desirable for the electrical connections, e.g., data cables, to be located near retainers 12 to minimize the cable length or cable movement needed to accommodate tenting and/or splaying of keyboard segments 6, 8.

With reference to FIGS. 18, 19, 20 and 21, an adjustable ergonomic keyboard 102 includes keyboard segments 106 and 108 disposed on a stand alone base support 114. Keyboard 102 is configured as a peripheral data input device for use, for example, with a desktop computer 104. Keyboard segments 106, 108 are coupled by a joint/10 and secured to base support 114 by retainers 112. As previously described, joint/10 allows multiple degrees of freedom for tenting and splaying of keyboard 102.

Figure 18:
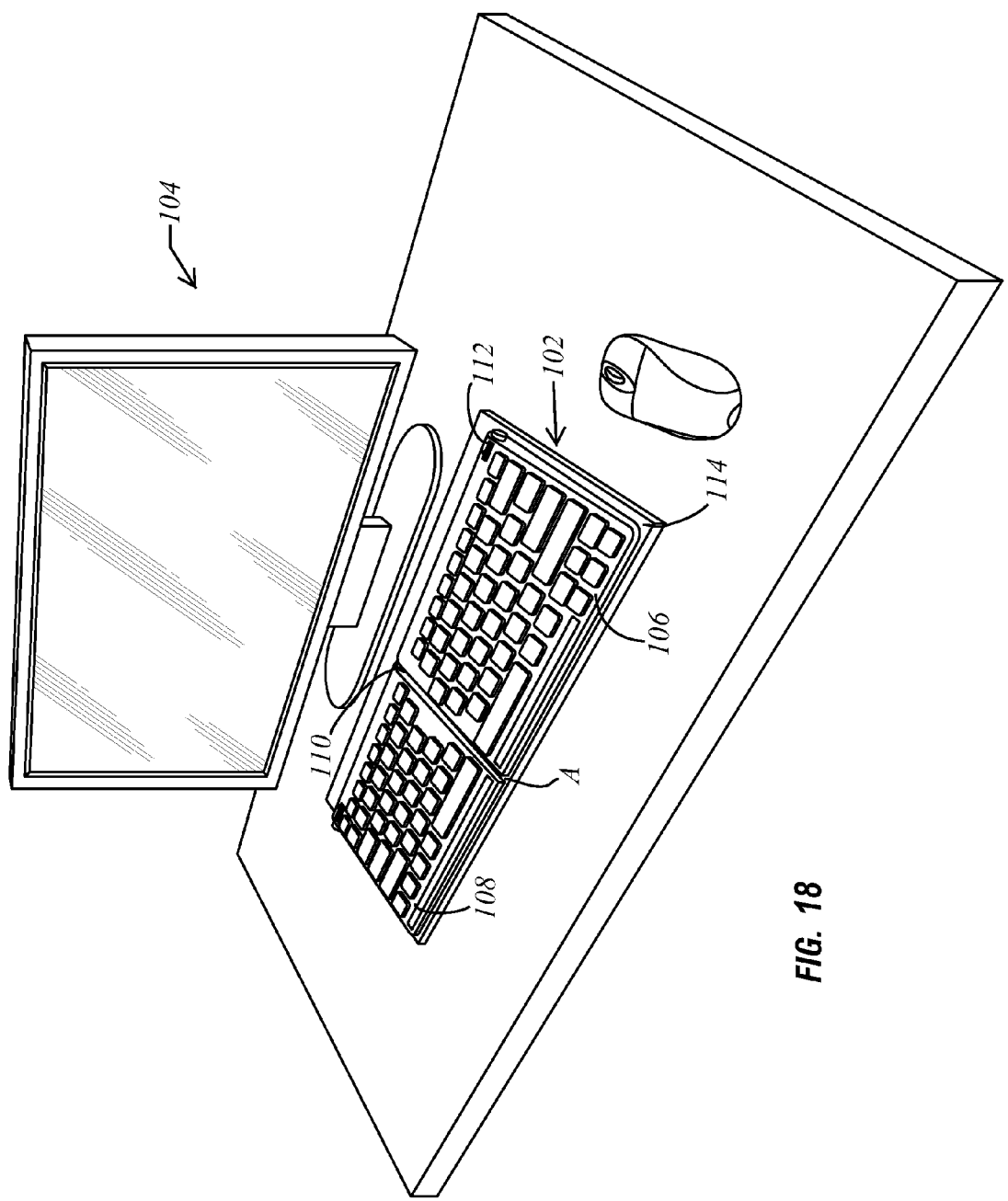
FIGS. 18, 19, 20 and 21 depict various positions of an adjustable ergonomic keyboard integrated with a base (for desktop use) in accordance with some implementations of the present invention.

With reference to FIG. 18, adjustable ergonomic keyboard 102 may be stored in a stowed position "A." In stowed position "A," keyboard segments 106, 108 are positioned close to base support 114 in a substantially planar, side-by-side arrangement. Of course, some users may elect to use keyboard 102 in the stored position in some circumstances.

Base support 114 can be configured with a minimum thickness and mass sufficient to support segments 106, 108. Such thin, lightweight designs may be advantageous or desirable for portability or stylistic considerations. For example, a lightweight aluminum or plastic panel or framework may provide a suitable base support 114 for segments 106, 108. In some desktop applications, a more substantial base may be advantageous or desirable for some users.

Base support 114 need not be coextensive with keyboard segments 106, 108 to provide sufficient support. For example, base support 114 may extend only under a portion of segments 106, 108 between retainers 112. In some implementations, segments 106, 108 may include a lower protective panel or cover and may be arranged to directly contact an upper surface of a desk with keyboard 102 in the splayed and/or tented positions. Accordingly, in some implementations, base support 114 may serve to maintain a relative position of retainers 112, without regard to contact between base support and any underlying surface.

Keyboard 102, including base support 114, may include any number of data ports or peripheral devices. For example, pointing devices or mass storage devices may be connected to keyboard 102 via USB port, PS2 port or other data ports. Similarly, any suitable connectivity or communication facilities, for example wireless communication via Bluetooth® technology, RF, IR, and the like may be used to connect keyboard 102 to computer 104. Such data ports and communications hardware may be housed on base support 114. For example, base support 114 may include a housing portion along an upper edge portion for any necessary hardware, batteries, data ports and the like.

Keyboard segments 106, 108 may be electrically coupled such that data is output from the segment pair from a single data port. For example, a flexible data cable or other suitable contact or electrical connector may be provided between segments 106, 108 near joint 10. Additionally, an infrared, radio or other electromagnetic or optical signal may be used to transmit signals from the keyboard to the computing device without the need for a cable or other physical connection.

Alternatively, segments 106, 108 may each include a separate data output connection. For example, each of keyboard segments 106, 108 may be treated, effectively, as a separate peripheral device. For example, a small USB hub may be provided on base support 114 to receive input from separate USB connectors on the respective segments 106, 108 and to provide a single output to computer 104. It may be advantageous to position the data output connections near retainers 112 to minimize the length and movement of the data output connections between keyboard segment positions. Such a connection may be configured to accommodate the fraction of an inch of lateral retainer travel and a predetermined arc of keyboard segment travel for a range of tented and splayed positions. Alternatively, electrical connections and data outputs may reside entirely on segments 106, 108 without electrical connection to base support 114. USB is but one example of wired connectivity and any number of other standards may be used to connect keyboard 102 as a peripheral or integrated device. In some cases, base support 114 supports segments 106, 108 without any electrical connection thereto. In other case, base support 114 carries data cables or other electrical communication devices.

Figure 19:
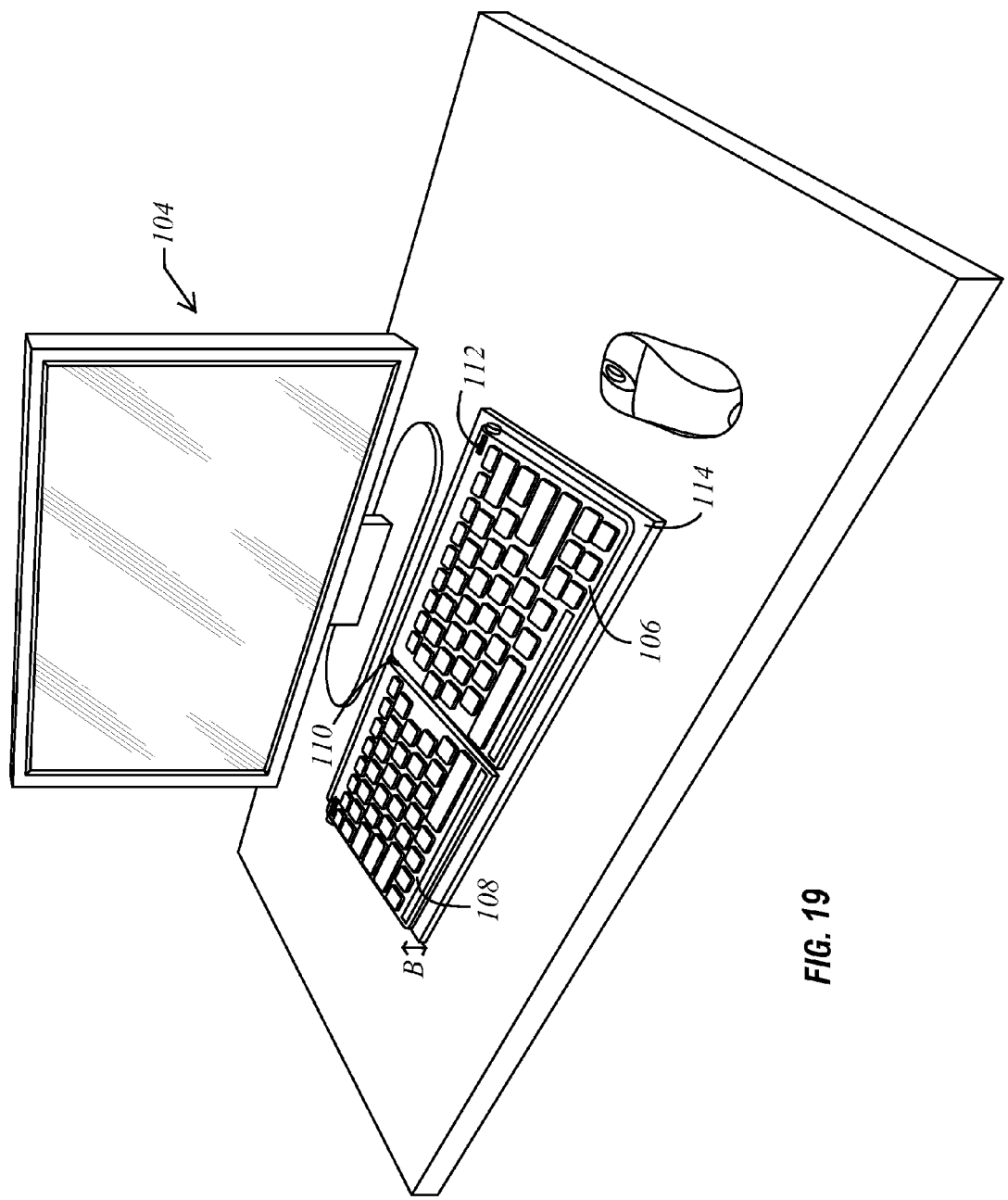

With reference to FIG. 19, keyboard 102 is in a released, unlocked or partially deployed position "B." In partially deployed position "B" keyboard segments 106, 108 are moveable to a desired tented or splayed position. Movement from stowed position "A" to partially deployed position "B" may include a simple unlocking action and need not include substantial relative movement or separation of keyboard segments 106, 108 from base support 114. In some cases, release of segments 106, 108 from the stowed position provides sufficient separation of segments 106, 108 from base support 114 to permit insertion of a user's fingers therebetween to manipulate segments 106, 108 into the positions shown in FIGS. 20-21. In some implementations, keyboard segments 106, 108 may be biased towards at least one of a partially splayed position and a partially tented position such that releasing segments 106, 108 from stowed position "A" results in a partially splayed and/or partially tented position.

Figure 20:
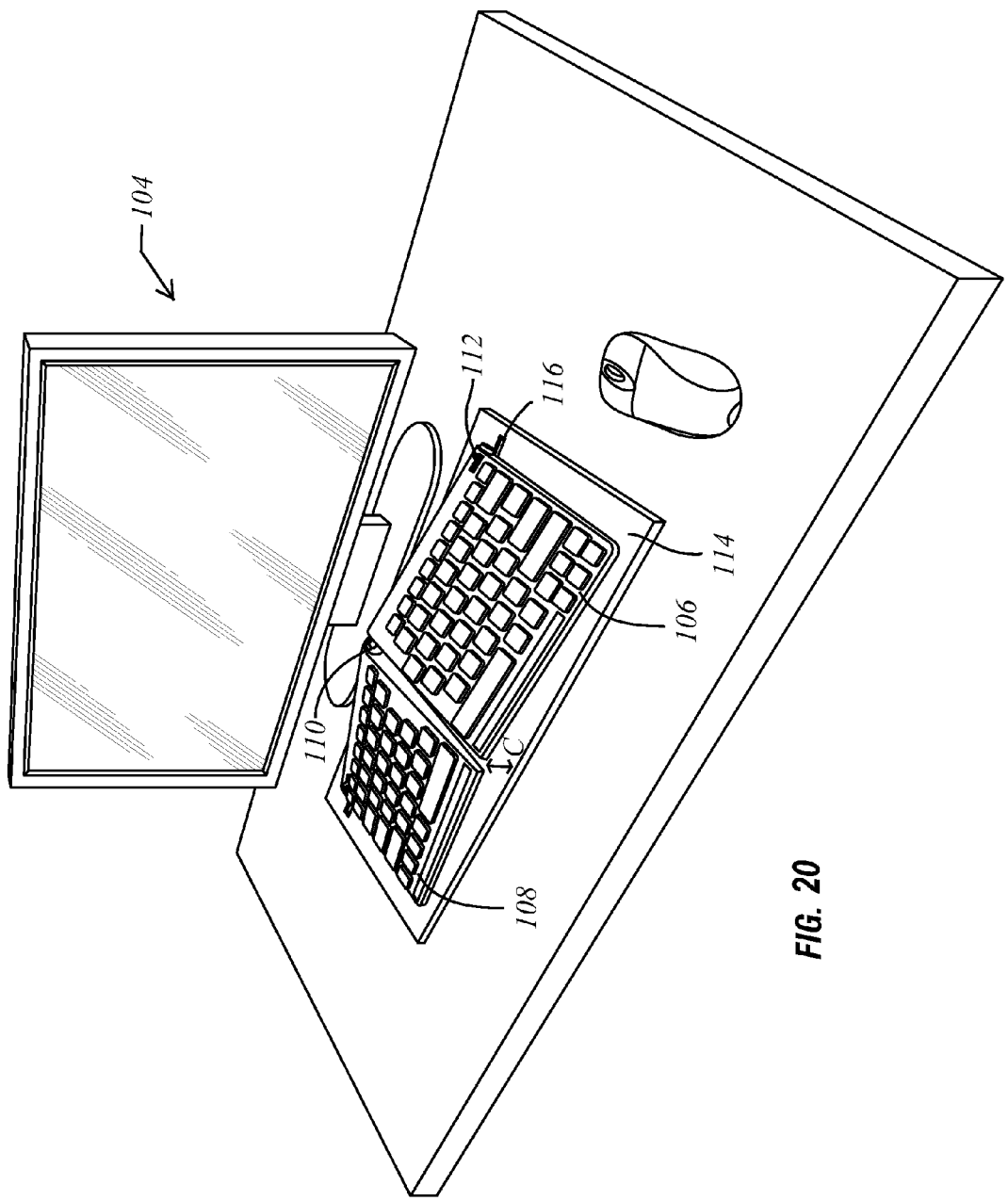

With reference to FIG. 20, keyboard segments 106, 108 are in a tented position "C." Tented position "C" is achieved by upward movement of joint 110 and inward movement of at least one of retainers 12 along channel 116 formed in base support 114.

Figure 21:
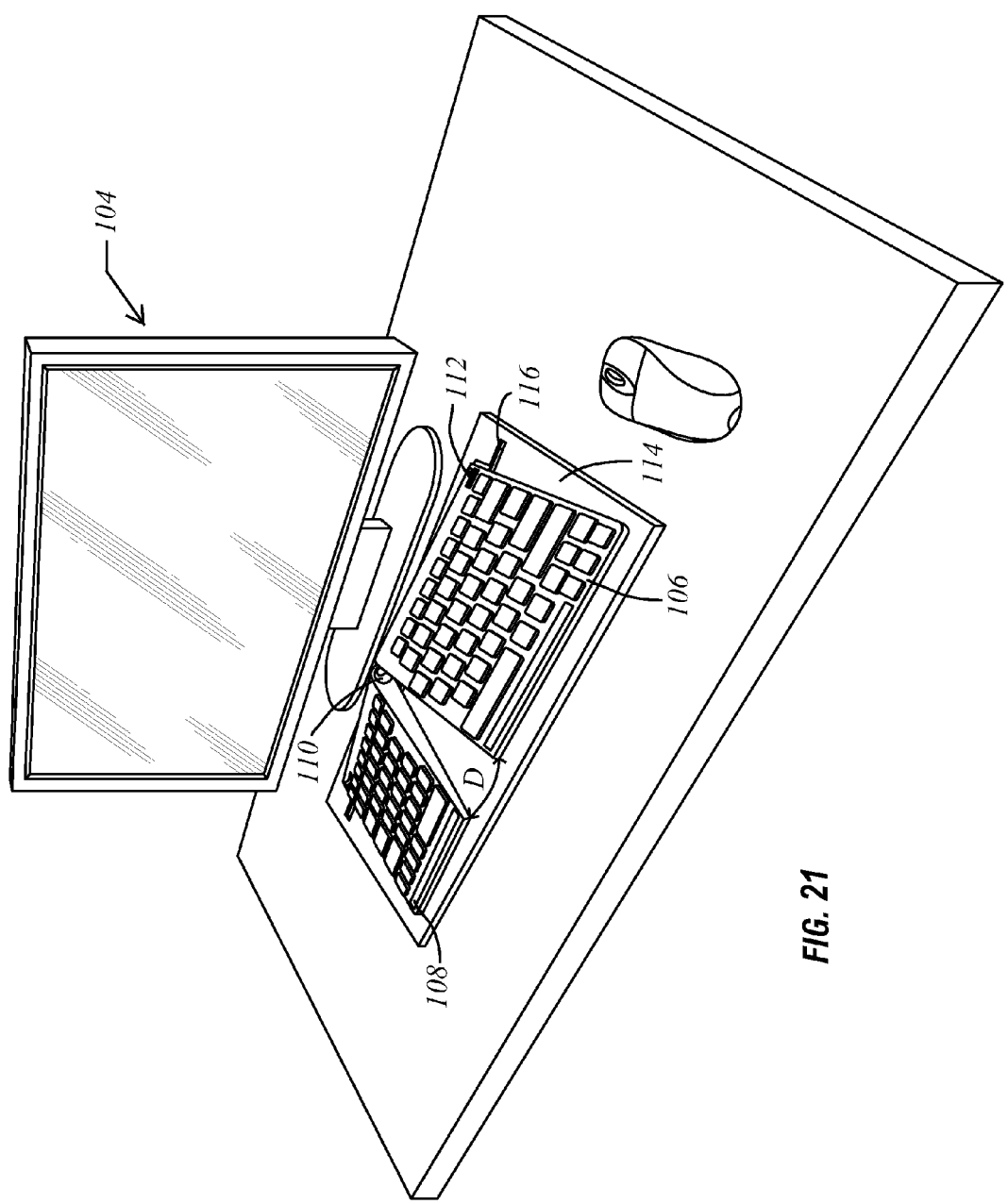

With reference to FIG. 21, keyboard segments 106, 108 are in a splayed and tented position. Splayed position "D" is achieved by forward movement of joint 110, movement of at least one of retainers 12 along channel 116 formed in base support 114 and rotation of segments 106, 108 about respective retainers 112. Keyboard segments 106, 108 may be locked to resist movement from positions "C" and "D." Advantageously, in some stand alone or desktop implementations, keyboard 2 may be more securely fixed in positions "C" and "D" since there will be less need for repeated keyboard setup as with portable laptop implementations. Similarly, resistance of keyboard 102 to flattening of tented position "C" may be greater absent other considerations present in a portable laptop implementation.

Keyboard segments 106, 108 may include friction pads at points of contact with base support 114 or with an underlying surface to provide additional resistance to movement during typing. For example, rubber foot pads, or the like, may be provided at the lower outermost extremities of segments 106, 108 to frictionally engage base support 114 or a desk and resist outward movement of segments 106, 108 under downward pressure, e.g., during typing.

In some implementations, resistance to flattening of tented segments 106, 108 may be provided by one locking mechanism and resistance to counter-rotation of splayed segments by another mechanism. For example, resistance to flattening may be provided by any suitable tensile structure between retainers 112, e.g., a rigid or semi-rigid base or even a cable. Resistance to counter-rotation of splayed segments may be provided by resistance at one or more of retainers 112 and joint 110. In a particular implementation, resistance to rotation of segments 106, 108 is provided at each of retainers 112 and joint 110, with release of resistance at a selected one of retainers 112 or joint 110 allowing for manual rotation of segments 106, 108. In some implementations, sufficient resistance may be provided by joint 10 or 110 alone to maintain position "C" and/or "D."

In some implementations, base support 114 may include surface features configured to provide discrete positioning or incremental resistance points. For example, a series of depressions or ridges may be provided on base support 14 or 114 to more positively engage corresponding contact surfaces of segments 106, 108.

In some implementations, a web may be provided between segments 106, 108 to provide an appearance of central keyboard continuity in splayed position "D". Such a web may be slidably deployed from the underside segments 106, 108 and may contribute resistance to movement.

In some implementations, base support 14, 114 is adjustable to facilitate movement of keyboard segments to positions "C" or "D." For example, base support may be collapsible to move retainers 112 closer together to achieve tented position "C."

In each case, it will be understood that the configuration of the keys on segments 6, 8, 106, 108 may be in any suitable form which allows access to the appropriate hand corresponding to segments 6, 8, 106, 108, and need not be the configuration shown in FIG. 1.

Similarly, segments 6, 9, 106, 108 may include virtual keys, e.g., keys displayed on a touch screen panel, membrane display, or other suitable display besides a traditional vertically operable contact type key. For example, as an alternative to conventional mechanical switches, keyboard inputs may include pressure sensors, static sensors, position sensors, capacitance sensors, or other suitable contact or non-contact sensors. For example, segments 6, 9, 106, 108 may simply be projection surfaces for use with a laser and infrared projected virtual keyboard. In some embodiments, segments 6, 8, 106, 108 a part of a membrane keyboard, dome-switch keyboard, scissor-switch keyboard, capacitive keyboard, mechanical-switch keyboard, buckling-spring keyboard, hall-effect keyboard, or laser keyboard. Accordingly, any suitable manual data entry system may be presented on segments 6, 9, 106, 108 to be arranged in a tented and/or splayed position by a user.

It should be appreciated that splaying of the segments 6, 8, 106, 108 acts to prevent or reduce ulnar deviation of the user's hands and wrists, while pitching or "tenting" movement of segments 6, 8, 106, 108 acts to prevent or reduce pronation of the user's wrists.

In some implementations, an optional support (not shown) may be provided generally below the hinge or joint 10, 110 so as to maintain the central region of the keyboard 2, 102 at a raised preselected level, if desired.

Operation and manipulation of the keyboard 2, 102 of the present invention will now be described. When it is desired to set a new position of keyboard segments 6, 8, 106, 108 relative to one another, retainers 12, 112 and or joints 10, 110 are allowed to move, e.g., translate and/or rotate, to accommodate splayed and/or tented keyboard positions. After a desired orientation of the segments 6, 8, 106, 108 relative to one another is achieved, the segments are held in position by resistance at at least one of retainers 12, 112 and/or joints 10, 110. In the locked position, keyboard 102 remains substantially as arranged under normal typing conditions.

Figure 22:
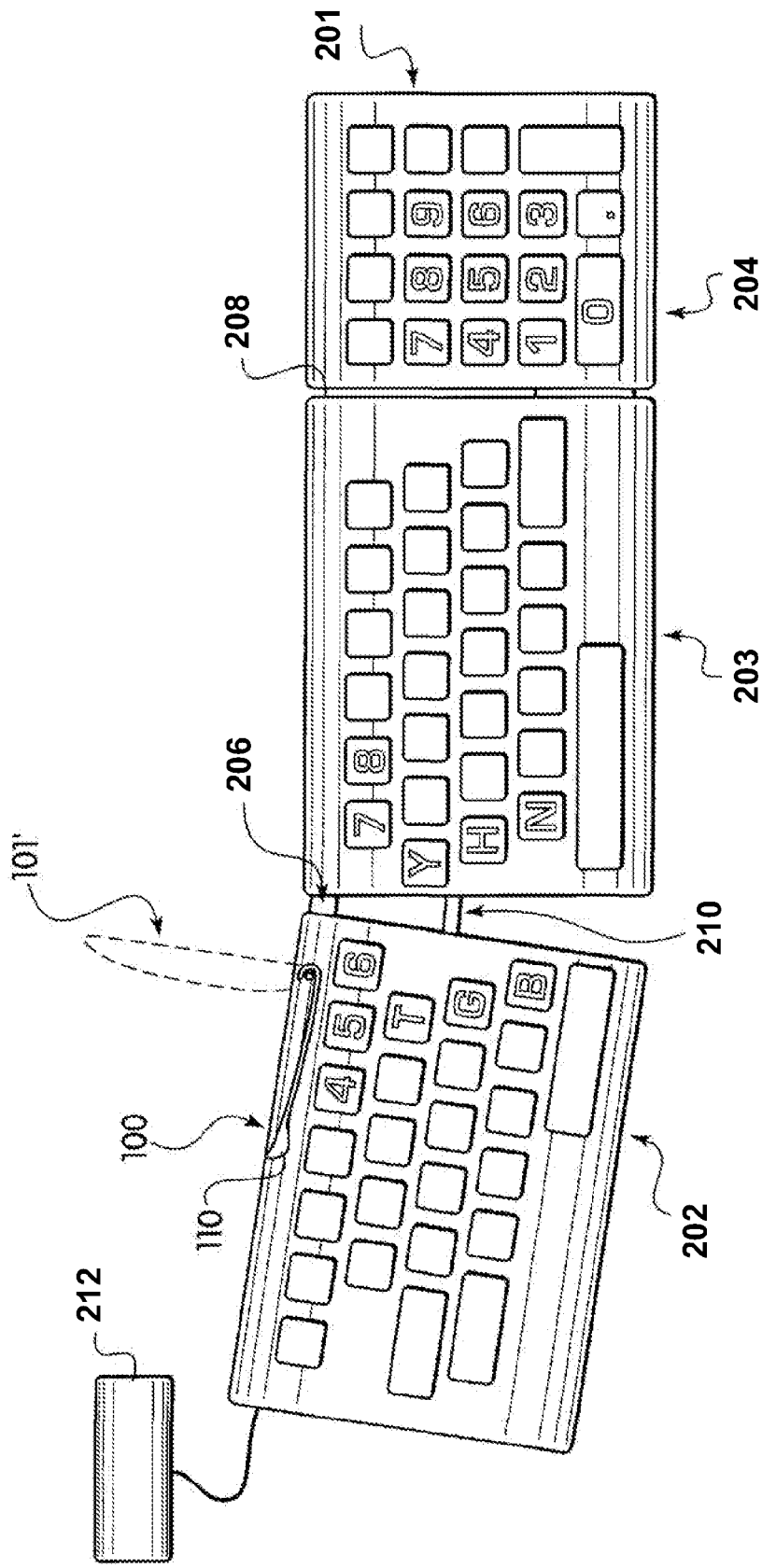
FIG. 22 is a schematic plan view of a keyboard of the present invention.

With reference to FIG. 22, keyboard 1 includes separate segments 202, 203, and 204, each having a plurality of keys 205. It is to be understood that the configuration of the keys on segments 202, 203, and 204, may be in any suitable form which allows access to the appropriate hand corresponding to segments 202, 203, and 204, and need not be the configuration shown in FIG. 22.

Segments 202 and 203 of keyboard 201 are usually attached by a hinge or joint 206, which may provide one or more degrees of freedom of relative movement between segments 202 and 203. Adjustment and locking of hinge or joint 206 are described in more detail below with regard to a lever-actuated locking joint embodiment. As described in more detail below, a handle 100, in the form of a lever, forms a portion of a keyboard locking mechanism. The handle 100 may be pivoted from a locked position, which fixes the position of the hinge or joint 206, to an unlocked position 101' (dashed lines), which allows pivoting movement of the segments 202, 203 relative to one another in one or more planes. The segment 202 or 203 containing the handle 100 may include an indentation 110 near the end of the handle 100 to allow easier access to, and pivoting of, the handle 100 by the user.

Segment 204 of keyboard 201, if provided, has mounted thereon numerical keys 205 and is attached to segment 203 by hinge or joint 207. Hinge or joint 207 may extend along line 208 illustrated in FIG. 22 so as to provide at least one degree of relative movement between segments 203 and 204. Alternatively, a hinge or joint of the type described below may be employed between segments 202 and 203 and may be located at either an upper or lower end of line 208 in FIG. 22. Segment 204 is an optional segment, and the keyboard 201 may be formed of only segments 202 and 203.

Figure 23:
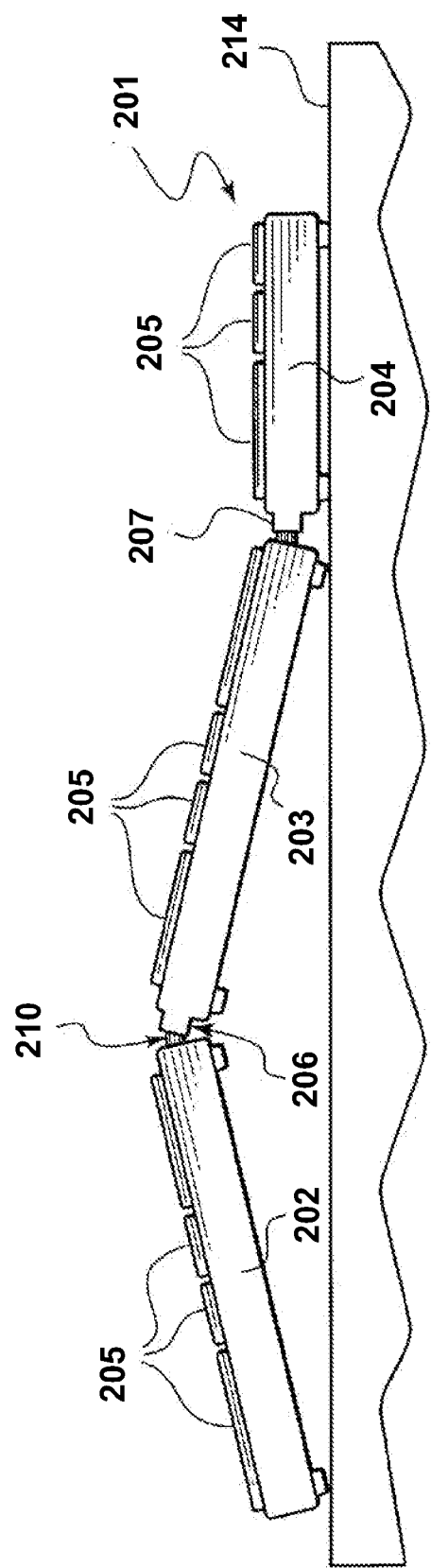
FIG. 23 is a schematic elevational view of the keyboard of FIG. 22.

It should be appreciated that segments 202 and 203 of keyboard 1 may pivot with respect to one another while each remaining in a single plane (i.e., the plane of FIG. 22), or in multiple planes (i.e., the planes of FIGS. 22 and 23). Movement of the segments 202, 203 in the plane of FIG. 22 acts to prevent or reduce ulnar deviation of the user's hands and wrists, while movement of the segments 202, 203 in the plane of FIG. 23 acts to prevent or reduce pronation of the user's wrists. As depicted in FIG. 23, a center region of keyboard 201 is raised above the level of a desk 214 on which the keyboard 201 is supported. An optional support (not shown) may be provided generally below the hinge or joint 206 so as to maintain the central region of the keyboard 201 at a raised preselected level, if needed.

Should an operator of the keyboard 201 not be comfortable with a hinged-apart orientation of the keyboard 201, the keyboard 201 may simply be returned to a conventional configuration.

In order to electrically connect the keys of one segment (e.g. segment 202) to the other (e.g. segment 203), a cable 210 or any suitable contact may be provided between the two segments. Additionally, an infrared or other electromagnetic signal may be used to transmit signals from the keyboard to the computing device without the need for a cable or other physical connection.

FIG. 24 shows an exploded view of the components of a first embodiment of a locking mechanism and hinge or joint of the present invention. A handle 100, in the form of a lever, includes a handle section 101 at one end and a cam 109 at another end. Cam 109 includes a cam surface 103. On either side of cam 109 are flanges 111, each of which defines a hole 105. A cam hole 107 passes through cam 109 and is aligned with holes 105. Handle 100 is preferably made of an inexpensive, but relatively rigid, material such as an engineering plastic such as polyketon, sold under the trade name CARILON.

A retaining pin 200 passes through holes 105 and the cam hole 107, to retain handle 100 on socket element 700. Pin 200 is preferably manufactured of an inexpensive and somewhat resilient material, such as an engineering plastic, for example a glass-filled polyamide or nylon, sold under the trade name GRIVORY GV-5H, and has at least one end which is slightly enlarged, so as to allow a press or interference fit between the pin 200 and holes 105, to thereby hold handle 100 and socket element 700 together. Flanges 701 on socket element 700 fit slidingly within slots 113 between flanges 111 and cam 109, such that pin 200 fits through holes 105, holes 702 on flanges 701, and the cam hole 107, thereby allowing pivoting of handle 100 relative to socket element 700 about the axis of pin 200.

A camming pin 300 is retained adjacent to the cam 109. Camming pin 300 includes a camming surface 301 and a pin 302 projecting away from camming surface 301. Pin 302 fits through holes 401 and 501 in biasing element 400 and bearing element 500, respectively, such that bearing element 500, biasing element 400 and camming pin 300 are connected and aligned together Camming pin 300 is preferably made of an inexpensive, but relatively rigid, material such as an acetyl co-polymer or nylon, sold under the trade name DURACON-90.

A biasing element 400 is retained adjacent to the locking pin 300. The biasing element is preferably disc-shaped, and defines a hole 401 passing through its center. Biasing element 400 is preferably made of a relatively resilient material, such as a urethane rubber, or could be made of a spring steel component, so that it acts as a spring to provide a bias against the action of cam 109 during locking and unlocking. The biasing element 400 serves to reduce the need for exacting tolerances in the locking mechanism of the present invention.

The biasing element 400 can serve as a clutching mechanism so that if too much pressure is exerted on the keyboard segments 202, 203, the provision of the biasing element 400 allows for slippage between the ball element 600 and socket element 700 described below.

In some cases, the locking mechanism can be configured to provide sufficient resistance to movement under normal typing forces while yielding to direct repositioning forces, e.g., the manipulation of the two keyboard segments.

A bearing element 500 is retained adjacent to the biasing element 400. On the end of bearing element 500 adjacent to the biasing element 400, the bearing element 500 includes a hole 501, through which the end of pin 302 passes. The opposite end of bearing element 500 includes a bearing surface 502 which is preferably hemispherical in shape. The bearing element 500 is mounted within socket element 700 for sliding movement relative to both the keyboard segments 202, 203. The bearing element 500 is preferably made of a relatively inexpensive and rigid material, such as an acetyl copolymer, sold under the trade name DURACON M-90.

A ball element 600 is mounted adjacent to the bearing element 500. A ball 601 on ball element 600 fits within, and is slidably mounted against, bearing surface 502. A shaft 602 connects ball 601 to a retaining portion 603 of ball element 600. Retaining portion 603 may include one or more holes 604, which are used to affix ball element 600 to one of the keyboard segments 202, 203 or 204, via suitable attachment mechanisms such as screws or bolts. The ball element 600, although shown as spherical in the drawings, could alternatively be hemispherical in shape. The ball element 600 is preferably made of a relatively inexpensive and rigid material, such as a glass or mineral filled acetyl copolymer, or alternatively could be fabricated of stainless steel. In some cases, ball element 600 includes a pliable material. In an alternative embodiment of the invention, the cam surface 103 may provide direct contact with the ball element 600, thereby eliminating the need for the bearing element 500 and biasing element 400.

Ball 601 fits within a socket element 700, such that the shaft 602 and retaining portion 603 project out of an opening 706 in socket element 700. An interior bearing surface of socket element 700, at socket end 705, is hemispherical in shape. Ball 601 on ball element 600 fits within, and is slidably mounted against, the bearing surface within socket end 705. Socket element 700 includes flanges 701, which are spaced and shaped so as to slidably fit within slots 113 on handle 100. Holes 702 on flanges 701 are spaced to align with holes 105 on handle 100, and the cam hole on handle 100, so that the pin 200 can fit through those holes, allowing the handle 100 to be pivoted relative to socket element 700. Socket element 700 may also include a flange 703 with one or more holes 704, which are used to affix socket element 700 to one of the keyboard segments 202, 203 or 204—adjacent the segment 202, 203 or 204 to which ball element 600 is affixed—via suitable attachment mechanisms such as screws or bolts. The socket element 700 is preferably made of a relatively inexpensive and rigid material, such as a glass or mineral filled acetyl copolymer, or alternatively could be fabricated of metal.

With continued reference to FIG. 24, a ball-and-socket type joint includes ball 601 positioned to be retained between the bearing surface 502 and the bearing surface inside the socket end 705, allowing the ball 601 to rotate therebetween. Frictional surface features 605 defined on ball 601 provide increased friction and/or shear resistance to movement of ball 601 relative to surfaces of socket 705, including bearing surface 502. Frictional surface features, or simply "surface features" include at least one of a plurality of recesses and a plurality of projections that serve to provide frictional resistance or shear resistance to movement of the joint to thereby lock the keyboard segments in a desired position. In some cases, surface features 605 need not provide interlocking shear resistance but may mainly provide frictional resistance.

Surface features 605 can include a range of topologies, for example, projections, ridges, raised grids, recesses, valleys, dimples, or recessed grids, selected to impinge upon, bind upon or otherwise engage bearing surface 502 or other socket surfaces or features. In some cases socket surfaces can include a resilient material compressible to at least partially conform to surface features 605. In some cases, surface features 605 can be formed of a resilient material. While surface features 605 are depicted as covering a substantial portion of the exterior of ball 601, provision of surface features 605 on a more localized portion of ball 601 may be sufficient in some cases. For example, if complementary surface features are provided on a socket surface, increased joint resistance may be provided with fewer or smaller surface features 605 on ball 601. Conversely, surface features 605 may be propagated so as to maximize friction in contact with multiple socket surfaces, including stationary socket surfaces and/or moveable bearing surfaces.

Figure 25:
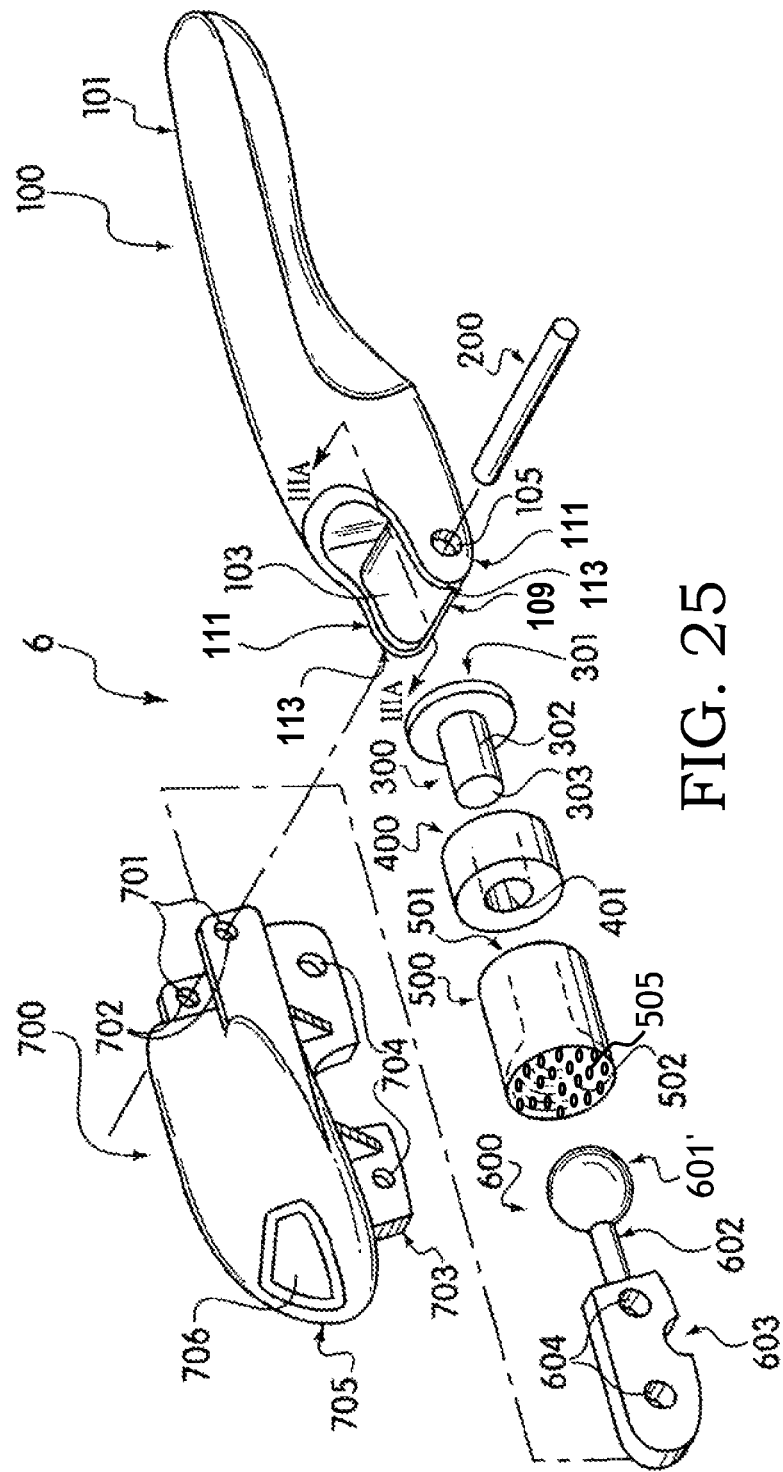
FIG. 25 is an exploded perspective view of an embodiment of the lockable joint and frictional surface features.

With reference to FIG. 25, surface features 505 are defined on bearing surface 502' to impinge up or engage the surface of ball 601'. Surface features 505 can include, for example, projections, ridges, raised grids, recesses, valleys, dimples, or recessed grids, selected to impinge upon, bind upon or otherwise engage ball 601'. While surface features 505 are depicted on bearing surface 502', surface features can be formed on any number of socket surfaces or other surface bearing on ball 601'.

Figure 26:
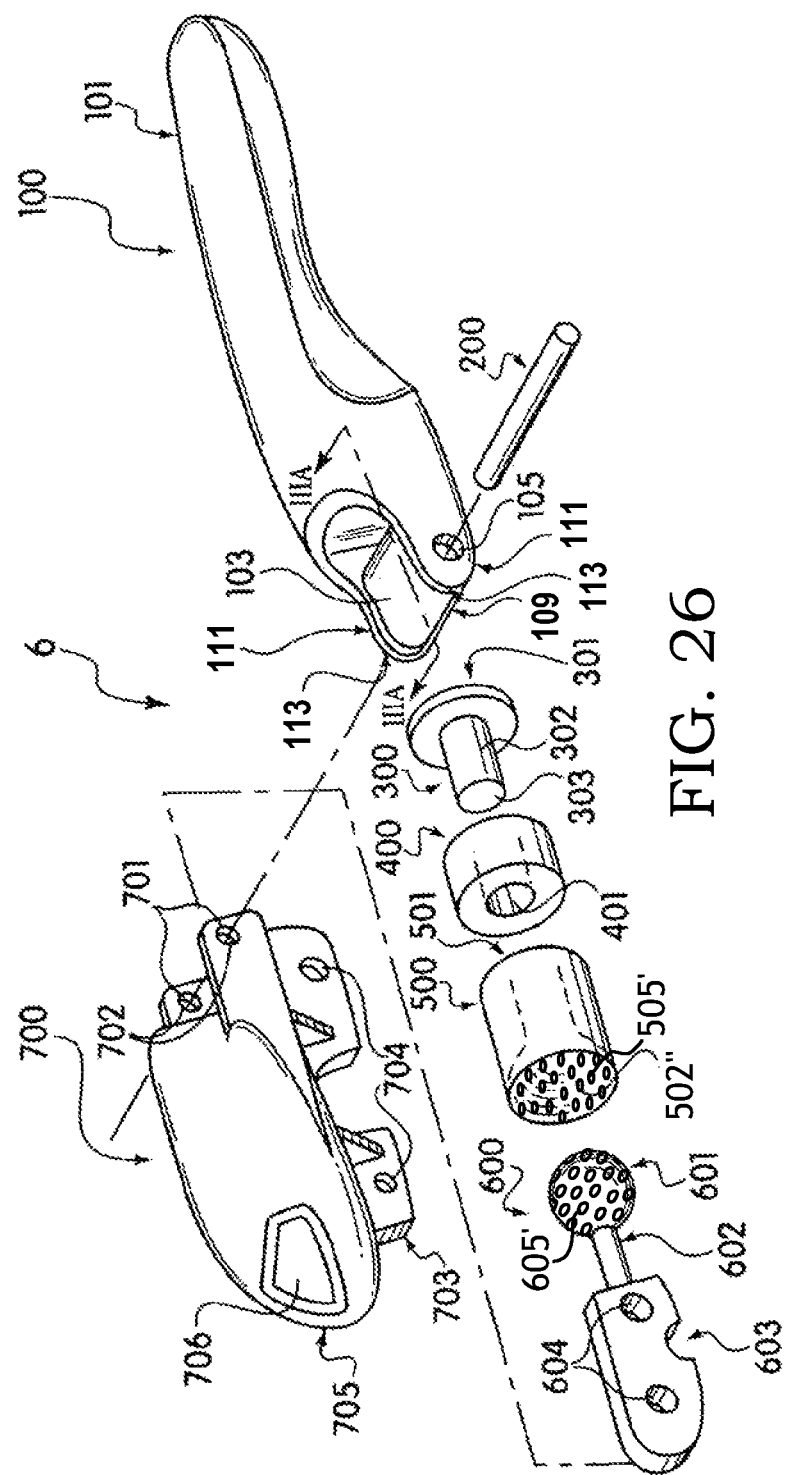
FIG. 26 is an exploded perspective view of an embodiment of the lockable joint and frictional surface features.

With reference to FIG. 26, surface features 605' are defined on ball 601 and complementary surface features 505' are define on bearing surface 502". In some cases, surface features 605' include projections while surface features 505' include complementary recesses. In some cases surface features 505' include projections while surface features 605' include complementary recesses. In some cases, surface features 505' and 605' include complementary repeating patterns providing a range of nested surface feature positions. For example, in some cases, surface features 505' and 605' include dimpled and raised patterns providing one or more cup and cone interface regions generating frictional and/or shear resistance to joint movement.

While surface features 505' and 605' are depicted as being substantially symmetrical and evenly distributed, some implementations are not so limited. Surface features 505' and 605' can be of any suitable size, shape, density, continuity, hardness, durometer, or the like, sufficient to provide resistance to movement of ball 601' within socket element 700 or against bearing surface 502".

A releasable joint locking mechanism has been described as including a lever, pivots and various moving parts for use in some implementations. In some implementations, however, surface features 505' and/or 605' can provide sufficient resistance within a constant pressure joint or otherwise without the need for levers, pivots, or other moveable locking mechanism parts. For example, ball 601 may be interferingly received into a socket element 700 with surface features 505' and/or 605' generating sufficient frictional and/or shear resistance to relative movement therebetween to maintain the keyboard segments in a desired position under normal typing or other operational forces.

In some implementations, surface features 505' and/or 605' can provide a more affirmative shear resistance to movement, e.g., through engagement of a pin-like projection surface feature with a hole or other suitable shear surface features. Shear producing surface features may be releasable and/or engageable under actuation of a biasing member or under operation of a manual actuator. One example of a manual actuator is a finger button or thumb button operable to at least partially disengage complementary surface features, for example, through at least partial separation of ball 601' and socket element 700.

Surface features 505' and 605' can be arranged to provide a user an incremental adjustment feedback, e.g., a ratcheting feel or clicking sound. For example, complementary circumferential surface features, e.g., serrations, along opposing hemispherical or spherical surfaces of ball 601' and socket elements 700 may intermittently engage and release as the keyboard segments are manually positioned.

Surface features 505' and 605' can be integrally molded with ball 601' and socket element 700 or bearing surface 502 respectively. Alternatively, surface features 505' and 605' may be formed on respective surfaces through any suitable process. In a particular example, bearing surface 502 and ball 601' are provided with an elastomeric or rubberized layer bearing the respective surface features.

While the illustrated joint is a ball-and-socket type joint, surface projections 505 and/or 605 may be used on any number of other types of joints suitable to provide the desired degree of freedom for tenting and splaying of keyboard segments 202 and 203.

Operation and manipulation of the keyboard 1 of the present invention will now be described. When it is desired to set a new position of the keyboard 1 segments 202 and 203 relative to one another, the handle 100 is pivoted to its unlocked position 101'. Pivoting of the handle 100 is accomplished by rotating handle 100 about pin 200, thereby moving cam 102 relative to camming surface 301. In the unlocked position low 101', the cam surface 103 is spaced a shorter distance d.sub.1, from the axis of pin 200 that the distance d.sub.2 of cam surface 103 from the axis of pin 200 in the locked position. As a result, in the locked position, the cam 102 pushes the camming pin 300 in the direction of the ball element 600, and in the unlocked position low 101' the cam 102 allows camming pin 300 a degree of movement away from ball element 600, under the influence of biasing element 400.

In the unlocked position 101' the bias of biasing element 400 allows camming pin 300 to move in the direction away from ball element 600. This movement also allows movement of the bearing element 500 away from the ball element 600. As a result, the ball 601 is unclamped between the bearing surface 502 and the bearing surface inside the socket end 705, allowing the ball 601 to rotate between those surfaces. Rotation of the ball 601 is effected by pivoting movement, in one or more places, of the segments 202, 203 relative to one another, one of the segments 202, 203 being affixed to the retaining portion 603 projecting out of opening 706 in socket element 700, and the other segment 202, 203 being affixed to socket element 700.

When the segments are unlocked by moving handle 100 to unlock position 101', the segments 202, 203 may be pivoted in a horizontal plane (i.e., the plane of FIG. 1) relative to one another to reduce or eliminate ulnar deviation in the user's hands and wrists. The segments 202, 203 may also be pivoted in a vertical plane (i.e., the plane of FIG. 2) relative to one another to reduce or eliminate pronation in the user's wrists.

After a desired orientation of the segments 202, 203 relative to one another is achieved, the handle 100 is pivoted around pin 200 to its locked position, thereby moving cam 109 relative to camming surface 301. In the locked position, the cam surface 103 is spaced a longer distance d.sub.2 from the axis of pin 200 than the distance d.sub.1 of cam surface 103 from the axis of pin 200 in the unlocked position. As a result, in the locked position, the cam 102 pushes the camming pin 300 in the direction of the ball element 600. In the locked position, the camming pin 300 moves in the direction toward ball element 600. This movement pushes the biasing element 400, and thus the bearing element 500, toward the ball element 600. As a result, the ball 601 is clamped between the bearing surface 502 and the bearing surface inside the socket end 705, fixing the ball 601 against rotation between those surfaces as the result of frictional forces. The segments 202, 203 are thus fixed in position relative to one another, as a result of the clamping of ball 601 between the bearing surface 502 and the bearing surface inside the socket end 705, as well as fixing of one of the segments 202, 203 to the retaining portion 603 and the other segment 202, 203 to socket element 700.

Figure 27:
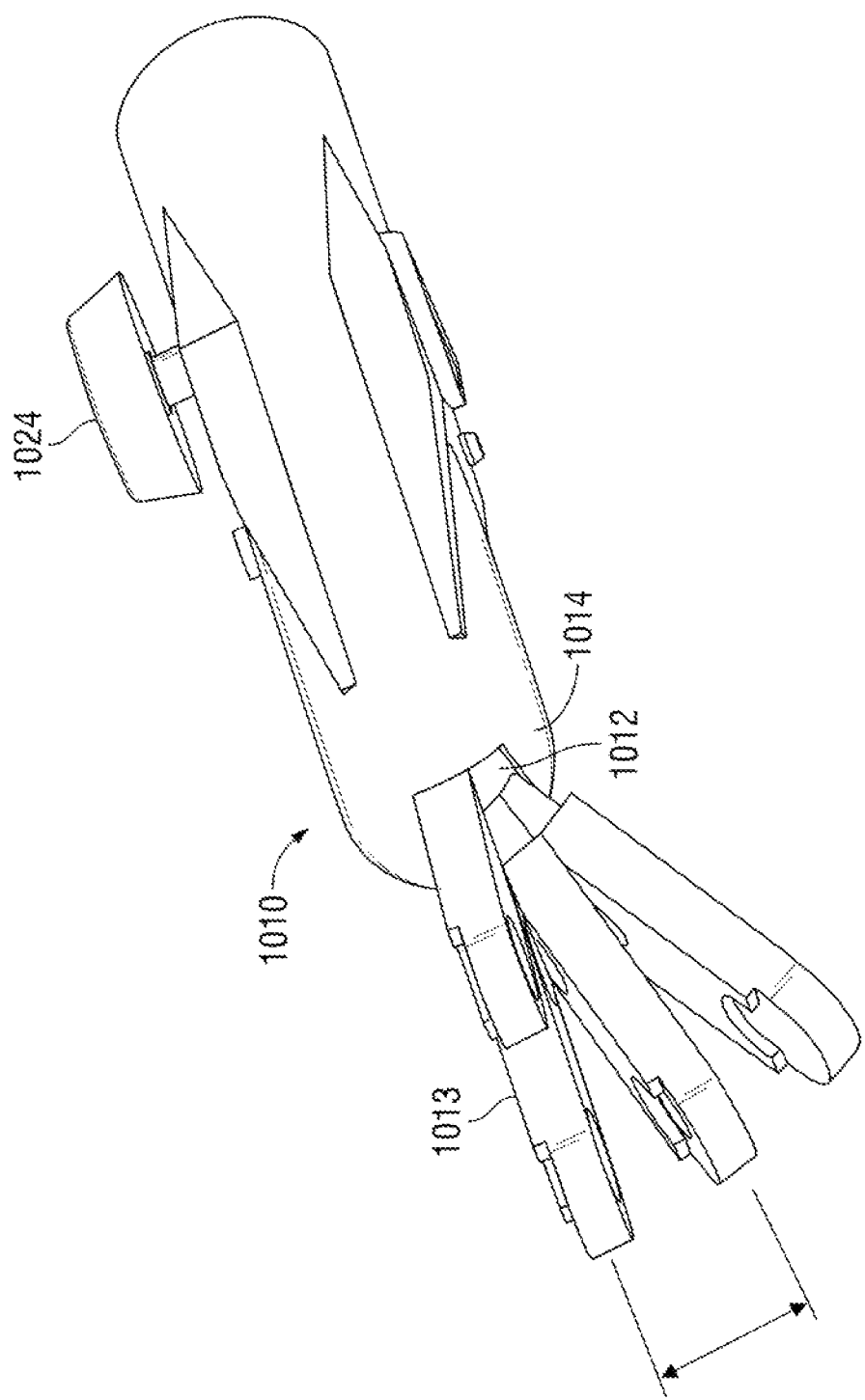
FIG. 27 is a side-perspective view of a lockable joint.
Figure 28:
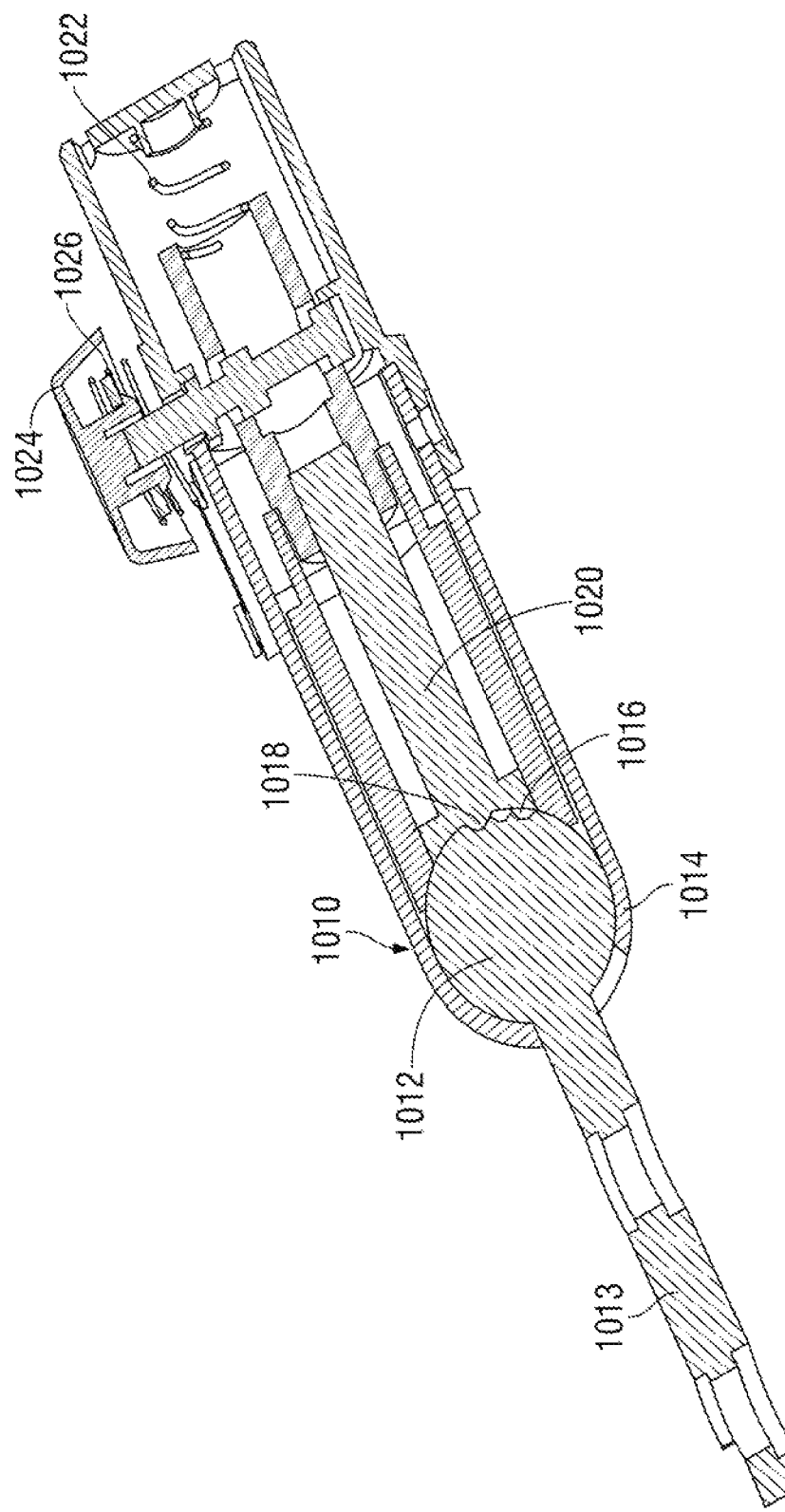
FIG. 28 is a cross-sectional view of the lockable joint of FIG. 27.

With reference to FIG. 27 one implementation of a joint 1010 suitable for use in an adjustable ergonomic keyboard as describe above, includes a ball-type joint element (ball 1012) and a socket 1014 to receive the ball therein in a range of relative orientations. Ball 1012 and 1014 are associated with corresponding first and second keyboard sections such that positioning of ball 1012 relative to socket 1014 defines a degree or splaying and/or tenting of the keyboard. For example, ball 1012 is attachable to a keyboard segment by armature 1013, which is shown as movable in both and an up-down range and a forward-back range relative to socket 1014. Socket 1014 can be associated with a respective keyboard section by any number of suitable attachment means, e.g., by fasteners through a body portion of socket 1014 or by incorporation of socket 1014 into the keyboard section. Similarly, actuator 1124 can be positioned near joint 1010 or remote therefrom on a keyboard section. It may be desirable in some implementations, With reference to FIG. 28, a cross-sectional view of the joint of FIG. 27, ball 1012 is positionally fixed in one of a number of discrete positions via engagement of complementary locking features 1016 and 1018 formed on respective surfaces of ball 1012 and socket 1014. Features 1016 and 1018 can be any combinations of projections and recesses or other interlocking features. Locking engagement of features 1016 and 1018 can be provided by a spring 1022 or other biasing mechanism urging a moveable member 1020 defining a portion of socket 1014 and bearing features 1018. Moveable member 1020 can be rely solely on spring 1022 for suitable resistance, or may further include an actuator 1024 operable to selectively lock and release moveable member 1020 to allow for adjustment of joint 1010 to a desired fixed keyboard position. For example, in some implementations actuator 1024 may counteract spring 1012, while in other implementations, actuator 1024 may simple lock moveable member 1020 against movement.

Figure 29:
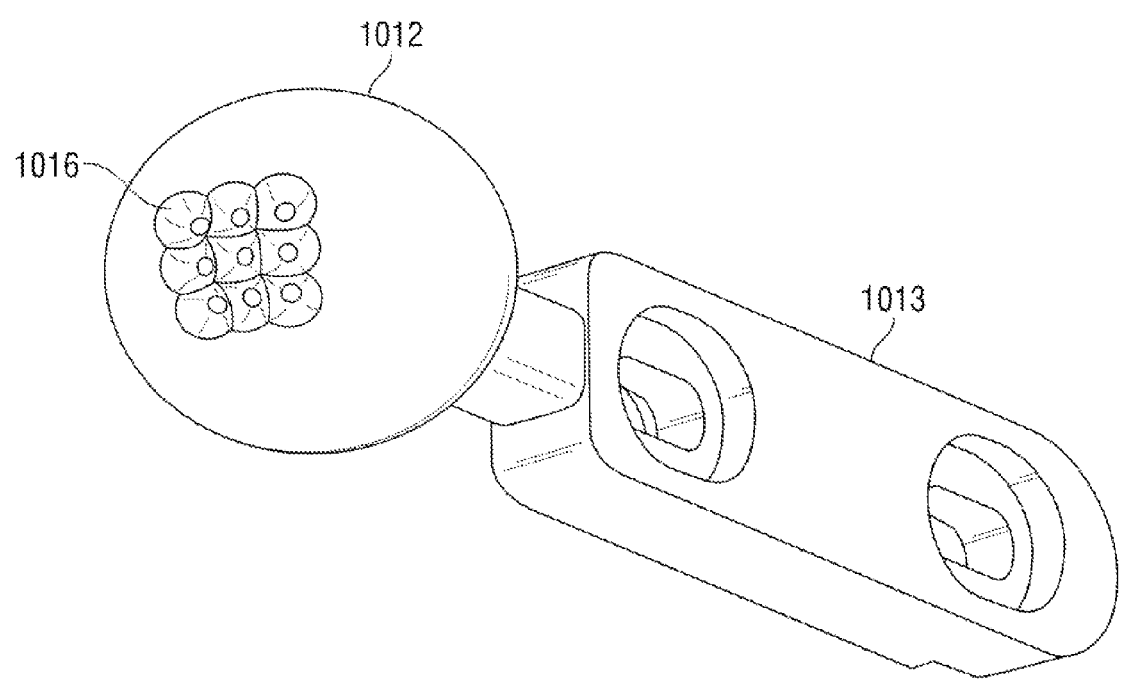
FIG. 29 is an end-on perspective view of a ball portion of the joint of FIG. 27.

With reference to FIG. 29, in some implementations, a surface of ball 1012 defines features 1016, e.g., a series of recesses for engagement with complementary features of socket 1014. Ball 1012 is depicted with nine different settings, allowing for an incremental splaying and/or tenting of the keyboard segments. In some implementations, a larger area of the surface of ball 1012 and/or socket 1014 may define additional fixed positioning features. Alternatively, ball 1012 and socket 1014 may be configured to provide a continuously variable range of positions, without regard to fixed interlocking of features, for example, with a set of features defined on the ball 1012 and an elastomeric surface on the socket 1014 to engage those features 1016 of ball 1012. In some implementations, an elastomeric engagement or spring-biased engagement of locking features may allow for forced adjustment of the keyboard without the need for an actuator. Stated otherwise, the joint 1010 may provide sufficient resistance to withstand typing forces in a desired position while allowing for forced repositioning when desired without the need for locking release otherwise.

While the forgoing represents a description of various embodiments or implementations of the invention, it is to be understood that the claims below recite the features of the present invention, and that other embodiments, not specifically described hereinabove, fall within the scope of the present invention.

What is claimed is:

1. A method of adjusting a keyboard having first and second segments coupled by a joint, the method comprising:
providing at least one of a (i) plurality of recesses and (ii) plurality of projections on a first surface of the joint to act as frictional surface features that engage a second joint surface and thereby restrict relative movement of the first and second segments;

displacing the at least one of a (i) plurality of recesses and (ii) plurality of projections of the first surface relative to the second surface; and positioning the first and second segments in at least one of a tented and splayed position, the frictional surface features maintaining the position of the first and second keyboard segments in at least one of the tented and splayed position during typing on the keyboard.

2. The method of claim 1, wherein displacing the frictional surface features includes at least partially separating the first and second surfaces by releasing a user-operable locking mechanism.

3. The method of claim 1, wherein displacing the frictional surface features includes manually overcoming static friction generated by the frictional surface features with the second surface to reposition the segments in one or more planes.

4. A keyboard comprising:

first and second keyboard segments each including on an upper surface thereof respective subsets of keys that together define a generally complete alphanumeric keyboard;

a joint coupling the keyboard segments and allowing the keyboard segments to pivot relative to one another;

a first joint surface including at least one of a plurality of recesses and a plurality of projections thereon; and a second joint surface frictionally engageable with the one of a plurality of recesses and a plurality of projections of the first joint surface to thereby resist movement of the joint to fix the two keyboard segments relative to one another.

5. The keyboard of claim 4, wherein the joint comprises a ball and socket.

6. The keyboard of claim 5, wherein the ball is compressed against the socket in a locked position by a locking mechanism.

7. The keyboard of claim 5, wherein the ball comprises the plurality of recesses and the socket comprises a plurality of projections engageable with the plurality of recesses over a range of joint positions.

8. The keyboard of claim 4, wherein the complementary second joint surface comprises a resilient material selected to at least partially conform to the one of a plurality of recesses and a plurality of projections presented on the first surface.

9. The keyboard of claim 4, wherein the second joint surface comprises at least one of a plurality of recesses and a plurality of projections.

10. The keyboard of claim 4, comprising the plurality of recesses presented on the first joint surface and further comprising one or more projections on the second joint surface engageable with the plurality of recesses to thereby restrict movement of the joint and fix the two keyboard segments relative to one another in a plurality of joint positions.

11. The keyboard of claim 4, further comprising:

a locking mechanism moveable to apply pressure between the first and second joint surfaces.

12. The keyboard of claim 11, wherein the locking member is positioned relative to the joint to permit substantially simultaneous manipulation of the locking mechanism and repositioning of the joint with one hand.

13. A keyboard comprising:

first and second keyboard segments, each segment including keys;

a ball-and-socket joint coupling the first keyboard segment and the second keyboard segment, a ball of the joint attached to the first keyboard segment and a socket of the joint attached to the second keyboard segment and retaining the ball therein and allowing the first keyboard segment and the second keyboard segment to pivot relative to one another; and at least one of a plurality of recesses and a plurality of projections presented on a bearing surface of at least one of the ball and the socket of the joint, thereby restricting the pivoting of the first keyboard segment relative to the second keyboard segment.

14. The keyboard of claim 13, further comprising:

a locking mechanism, the locking mechanism locking the ball in position within the socket and thereby restricting the pivoting of the first keyboard segment relative to the second keyboard segment.

15. The keyboard of claim 14, further comprising:

a bearing element engaging the ball in a locked position to lock the first keyboard segment relative to the second keyboard segment.

16. The keyboard of claim 13, wherein: the first keyboard segment and the second keyboard segment are positionable relative to one another to reduce at least one of pronation and ulnar deviation of a user's wrists.

17. The keyboard of claim 13, wherein: the joint is adapted to allow pivoting of the first keyboard segment and the second keyboard segment in both horizontal and vertical directions.

* * * * *